(12) United States Patent
Graube et al.

(10) Patent No.: US 12,086,762 B2
(45) Date of Patent: Sep. 10, 2024

(54) SCANNING FOR A BEACON TRANSMISSION FROM A WIRELESS ENERGY CHARGING-CAPABLE DEVICE

(71) Applicant: QUALCOMM Incorporated, San Diego, CA (US)

(72) Inventors: Nicolas Graube, Cambridge (GB); Abhishek Prasad, Cambridge (GB); Aline Coelho De Souza, Cambridge (GB); Mafalda Pereira Varela, London (GB); Laksh Bhatia, Cambridge (GB); Tingting Liu, Cambridge (GB); Robert Thomas Franzo, Northport, MI (US); Joe Thomas, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 223 days.

(21) Appl. No.: 17/810,514

(22) Filed: Jul. 1, 2022

(65) Prior Publication Data

US 2024/0005267 A1  Jan. 4, 2024

(51) Int. Cl.
*G06Q 10/087* (2023.01)
*G06K 7/10* (2006.01)
*H04W 4/80* (2018.01)

(52) U.S. Cl.
CPC ....... *G06Q 10/087* (2013.01); *G06K 7/10128* (2013.01); *G06K 7/10366* (2013.01); *G06K 7/10475* (2013.01); *H04W 4/80* (2018.02)

(58) Field of Classification Search
CPC ............ G06Q 10/087; G06Q 10/0833; G06K 7/10128; G06K 7/10366; H04W 4/80;
(Continued)

(56) References Cited

U.S. PATENT DOCUMENTS

2016/0299213 A1  10/2016  Jones et al.
2019/0354824 A1  11/2019  Mohiuddin et al.
(Continued)

FOREIGN PATENT DOCUMENTS

EP     3182609 A2    6/2017
WO  2022085837 A1    4/2022

OTHER PUBLICATIONS

International Search Report and Written Opinion—PCT/US2023/025582—ISA/EPO—Oct. 6, 2023.

*Primary Examiner* — Vernal U Brown
(74) *Attorney, Agent, or Firm* — Muncy, Geissler, Olds & Low, P.C.

(57) ABSTRACT

In an aspect, an asset tracking coordination component estimates a time of a beacon transmission from a wireless energy charging-capable device coupled to an asset within a threshold proximity of a scanning device based on an estimated distance between the asset tracking coordination device and the scanning device and timing information associated with a wireless energy transmission, and schedules a beacon scanning window for the scanning device to scan for the beacon transmission based on the estimated time. In a further aspect, a scanning device may both provide a wireless energy transmission and may also scan for beacon transmission(s) from wireless energy charging-capable device(s) during a beacon scanning window.

29 Claims, 16 Drawing Sheets

(58) Field of Classification Search
CPC ....... H04W 24/10; H04W 76/30; H02J 50/20; H02J 50/80; H03B 5/0037
See application file for complete search history.

(56) References Cited

U.S. PATENT DOCUMENTS

| | | | |
|---|---|---|---|
| 2020/0220391 A1* | 7/2020 | Zeine | H02J 50/40 |
| 2020/0293992 A1* | 9/2020 | Bogolea | H04N 7/188 |
| 2020/0328621 A1* | 10/2020 | Zeine | H02J 50/80 |
| 2022/0051310 A1 | 2/2022 | Graube et al. | |

\* cited by examiner

SCANNING FOR A BEACON TRANSMISSION FROM A WIRELESS ENERGY CHARGING-CAPABLE DEVICE

BACKGROUND OF THE DISCLOSURE

1. Field of the Disclosure

Aspects of the disclosure relate generally to wireless communications.

2. Description of the Related Art

Inventory (or asset) tracking systems may be used to track assets at various stages of distribution. For example, asset tracking systems may be deployed in warehouses, retail store spaces, and so on. For example, pallets include cases and totes may be assembled at distribution centers and then dispatched to specific retail stores. Once at a retail store, the pallets are broken down into cases and totes, that can be immediately moved to the shop floor for item level placement on shelves or re-stocking. Cases and totes can also be stored in backroom for later dispatch.

Real-time tracking of asset location (e.g., from pallet at distribution center to pallet at retail store to shelf at retail store, etc.) is difficult in current asset tracking systems. In particular, the ability for a retailer to determine precisely (or to a given degree of precision, e.g., such as knowledge of a count or quantity of assets, etc.), the stock currently available to physical customers ("brick & mortar" stores) is a difficult objective to achieve. Providing this information to a retailer may be of great value. For example, real-time tracking of asset count may help to facilitate updating of stock dynamically, on-demand or periodically, to improve logistics, to develop of more revenue streams, reduce waste and improve a "just in time" approach, leading to avoidance of empty shelves as well as unnecessary consumption of real-estate in backroom storage.

In addition to quantitative information about which products are in a store, knowledge of asset placement throughout the space and, accuracy of the expected deployment (plan-o-gram) with reality (real-o-gram) may also be important and valuable information to supply to any retailers. For example, identification of "displaced" items (e.g., customer picking up item and moving them out of basket somewhere else in store) through the store allows retailer to recover and re-organize.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of operating an asset tracking coordination component includes estimating a distance between a wireless energy source and a scanning device; determining timing information associated with a wireless energy transmission from the wireless energy source; estimating a time of a beacon transmission from a wireless energy charging-capable device coupled to an asset within a threshold proximity of the scanning device based on the estimated distance and the timing information; and scheduling a beacon scanning window for the scanning device to scan for the beacon transmission based on the estimated time.

In an aspect, a method of operating a scanning device includes receiving, from an asset tracking coordination component, a request to perform an asset scan in conjunction with a wireless energy transmission from the scanning device; performing, in response to the request, the wireless energy transmission; monitoring, in response to the request during a beacon scanning window that is based on the wireless energy transmission, for one or more beacon transmissions from one or more wireless energy charging-capable device coupled to one or more assets within a threshold proximity of the scanning device; and transmitting, to the asset tracking coordination component, scan result information based on the monitoring.

In an aspect, a method of operating an asset tracking coordination component includes transmitting, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receiving, from the wireless energy source, scan result information based on the monitoring.

In an aspect, an asset tracking coordination component includes a memory; at least one transceiver; and at least one processor communicatively coupled to the memory and the at least one transceiver, the at least one processor configured to: estimate a distance between a wireless energy source and a scanning device; determine timing information associated with a wireless energy transmission from the wireless energy source; estimate a time of a beacon transmission from a wireless energy charging-capable device coupled to an asset within a threshold proximity of the scanning device based on the estimated distance and the timing information; and schedule a beacon scanning window for the scanning device to scan for the beacon transmission based on the estimated time.

In an aspect, a scanning device includes a memory; at least one transceiver; and at least one processor communicatively coupled to the memory and the at least one transceiver, the at least one processor configured to: receive, via the at least one transceiver, from an asset tracking coordination component, a request to perform an asset scan in conjunction with a wireless energy transmission from the scanning device; perform, in response to the request, the wireless energy transmission; monitor, in response to the request during a beacon scanning window that is based on the wireless energy transmission, for one or more beacon transmissions from one or more wireless energy charging-capable device coupled to one or more assets within a threshold proximity of the scanning device; and transmit, via the at least one transceiver, to the asset tracking coordination component, scan result information based on the monitoring.

In an aspect, an asset tracking coordination component includes a memory; at least one transceiver; and at least one processor communicatively coupled to the memory and the at least one transceiver, the at least one processor configured to: transmit, via the at least one transceiver, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receive, via the at least one transceiver, from the wireless energy source, scan result information based on the monitoring.

In an aspect, an asset tracking coordination component includes means for estimating a distance between a wireless energy source and a scanning device; means for determining timing information associated with a wireless energy transmission from the wireless energy source; means for estimating a time of a beacon transmission from a wireless energy charging-capable device coupled to an asset within a threshold proximity of the scanning device based on the estimated distance and the timing information; and means for scheduling a beacon scanning window for the scanning device to scan for the beacon transmission based on the estimated time.

In an aspect, a scanning device includes means for receiving, from an asset tracking coordination component, a request to perform an asset scan in conjunction with a wireless energy transmission from the scanning device; means for performing, in response to the request, the wireless energy transmission; means for monitoring, in response to the request during a beacon scanning window that is based on the wireless energy transmission, for one or more beacon transmissions from one or more wireless energy charging-capable device coupled to one or more assets within a threshold proximity of the scanning device; and means for transmitting, to the asset tracking coordination component, scan result information based on the monitoring.

In an aspect, an asset tracking coordination component includes means for transmitting, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and means for receiving, from the wireless energy source, scan result information based on the monitoring.

In an aspect, a non-transitory computer-readable medium storing computer-executable instructions that, when executed by an asset tracking coordination component, cause the asset tracking coordination component to: estimate a distance between a wireless energy source and a scanning device; determine timing information associated with a wireless energy transmission from the wireless energy source; estimate a time of a beacon transmission from a wireless energy charging-capable device coupled to an asset within a threshold proximity of the scanning device based on the estimated distance and the timing information; and schedule a beacon scanning window for the scanning device to scan for the beacon transmission based on the estimated time.

In an aspect, a non-transitory computer-readable medium storing computer-executable instructions that, when executed by a scanning device, cause the scanning device to: receive, from an asset tracking coordination component, a request to perform an asset scan in conjunction with a wireless energy transmission from the scanning device; perform, in response to the request, the wireless energy transmission; monitor, in response to the request during a beacon scanning window that is based on the wireless energy transmission, for one or more beacon transmissions from one or more wireless energy charging-capable device coupled to one or more assets within a threshold proximity of the scanning device; and transmit, to the asset tracking coordination component, scan result information based on the monitoring.

In an aspect, a non-transitory computer-readable medium storing computer-executable instructions that, when executed by an asset tracking coordination component, cause the asset tracking coordination component to: transmit, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receive, from the wireless energy source, scan result information based on the monitoring.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
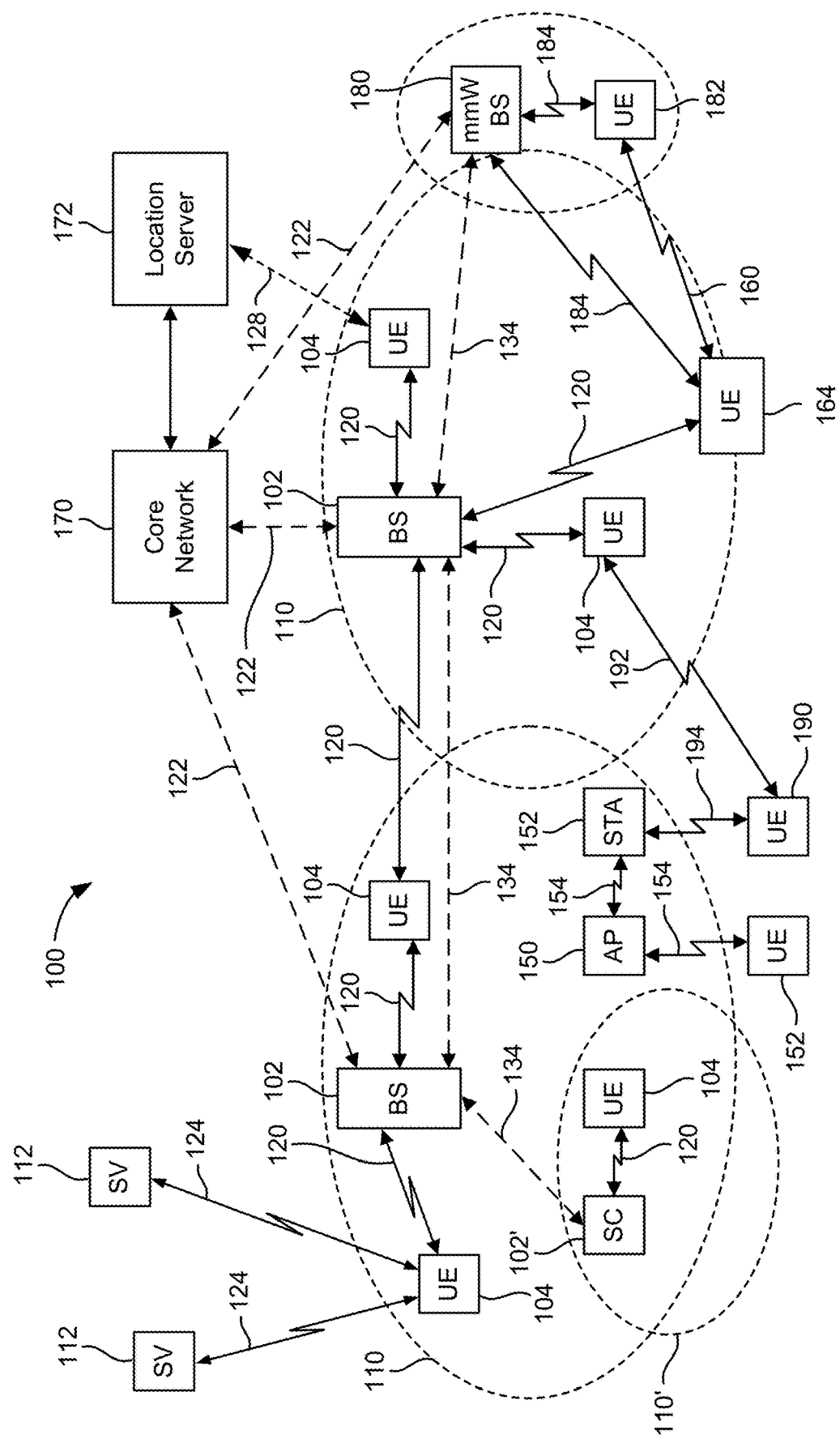
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
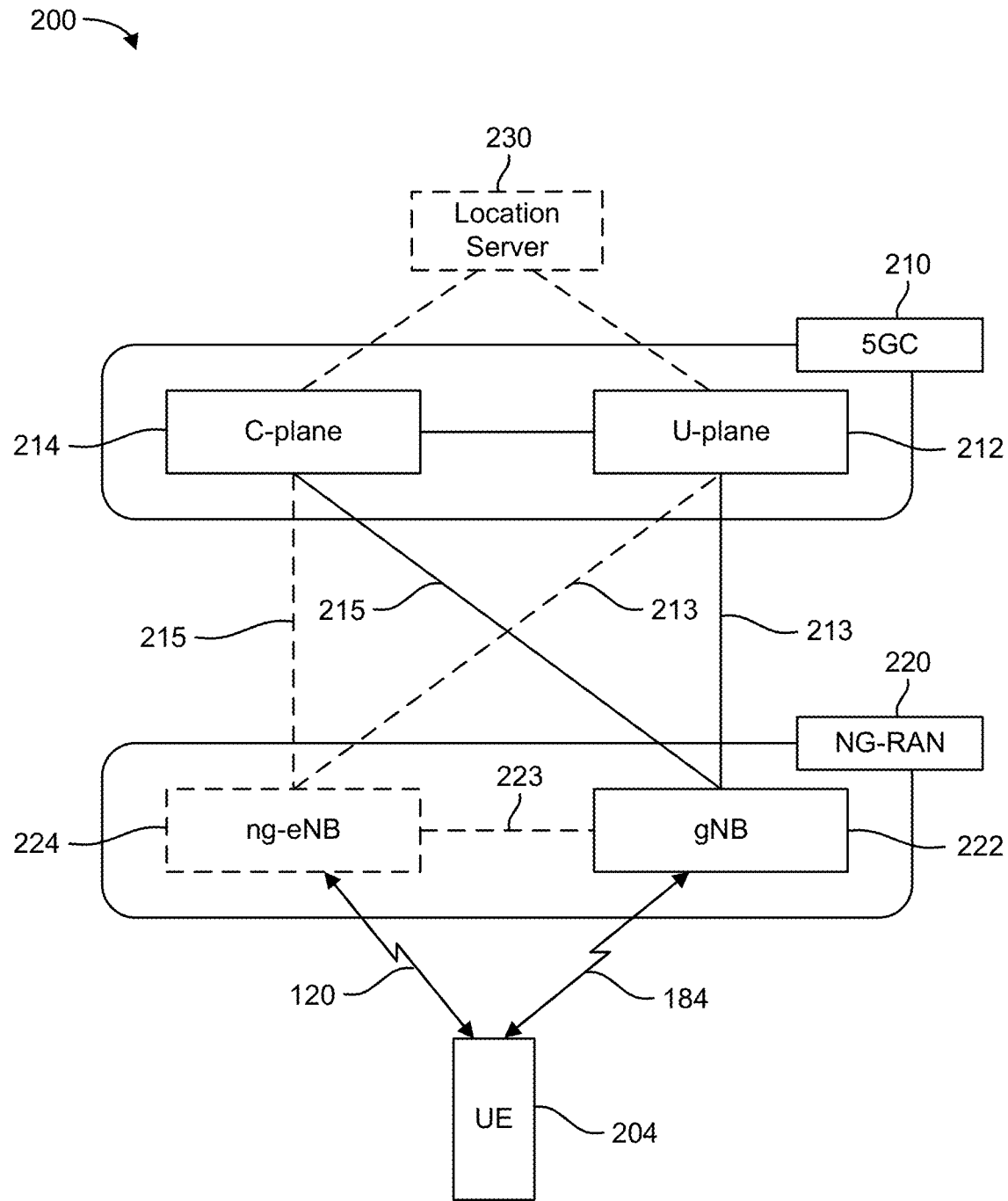
FIGS. 2A, 2B, and 2C illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
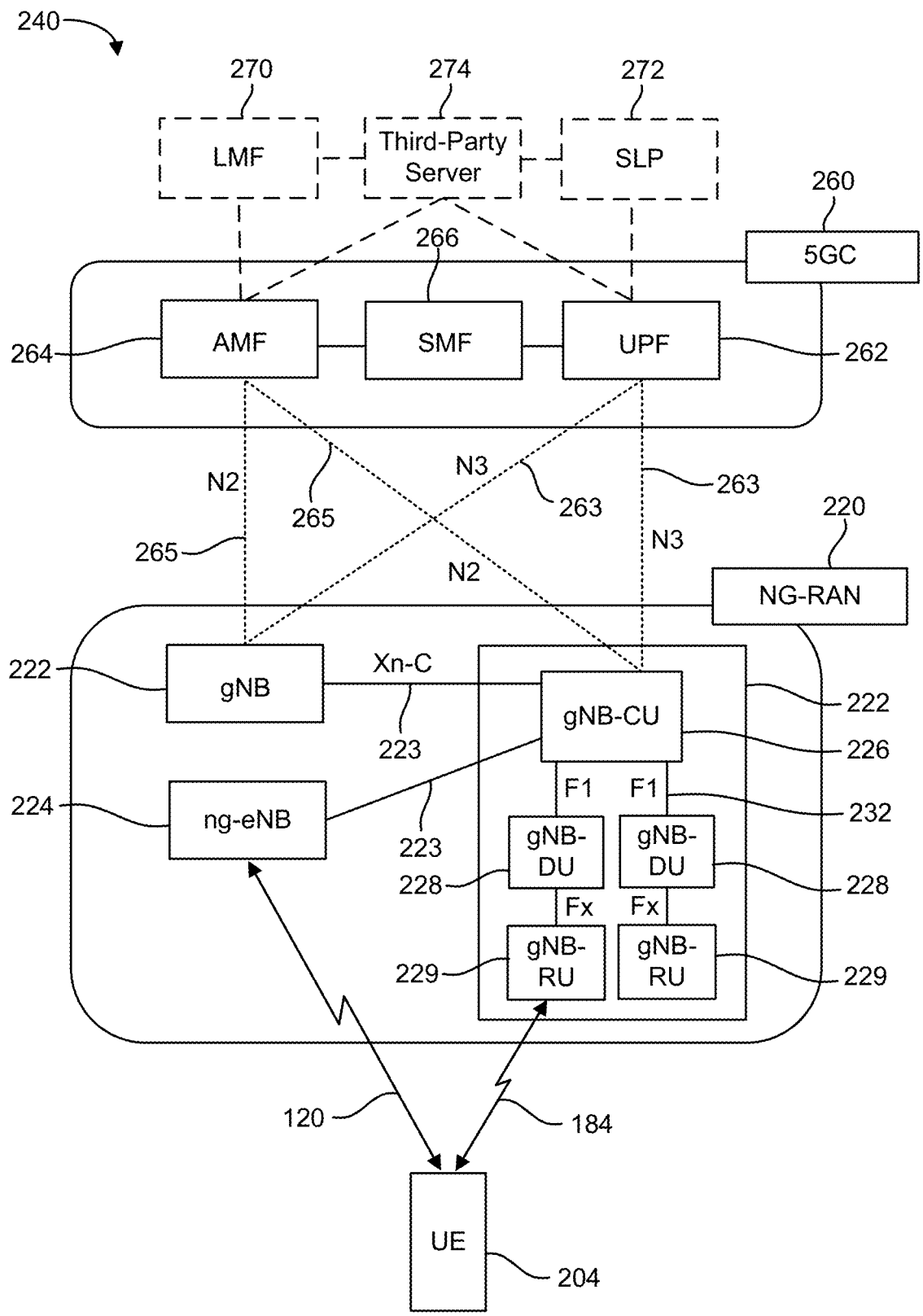

FIG. 2B illustrates another example wireless network structure 240. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (e.g., third-party server 274) over a user plane (e.g., using protocols intended to carry voice and/or data like the transmission control protocol (TCP) and/or IP).

Yet another optional aspect may include a third-party server 274, which may be in communication with the LMF 270, the SLP 272, the 5GC 260 (e.g., via the AMF 264 and/or the UPF 262), the NG-RAN 220, and/or the UE 204 to obtain location information (e.g., a location estimate) for the UE 204. As such, in some cases, the third-party server 274 may be referred to as a location services (LCS) client or an external client. The third-party server 274 can be implemented as a plurality of separate servers (e.g., physically separate servers, different software modules on a single server, different software modules spread across multiple physical servers, etc.), or alternately may each correspond to a single server.

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 may be divided between a gNB central unit (gNB-CU) 226, one or more gNB distributed units (gNB-DUs) 228, and one or more gNB radio units (gNB-RUs) 229. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 generally host the radio resource control (RRC), service data adaptation protocol (SDAP), and packet data convergence protocol (PDCP) protocols of the gNB 222. A gNB-DU 228 is a logical node that generally hosts the radio link control (RLC) and medium access control (MAC) layer of the gNB 222. Its operation is controlled by the gNB-CU 226. One gNB-DU 228 can support one or more cells, and one cell is supported by only one gNB-DU 228. The interface 232 between the gNB-CU 226 and the one or more gNB-DUs 228 is referred to as the "F1" interface. The physical (PHY) layer functionality of a gNB 222 is generally hosted by one or more standalone gNB-RUs 229 that perform functions such as power amplification and signal transmission/reception. The interface between a gNB-DU 228 and a gNB-RU 229 is referred to as the "Fx" interface. Thus, a UE 204 communicates with the gNB-CU 226 via the RRC, SDAP, and PDCP layers, with a gNB-DU 228 via the RLC and MAC layers, and with a gNB-RU 229 via the PHY layer.

Deployment of communication systems, such as 5G NR systems, may be arranged in multiple manners with various components or constituent parts. In a 5G NR system, or network, a network node, a network entity, a mobility element of a network, a RAN node, a core network node, a network element, or a network equipment, such as a base station, or one or more units (or one or more components) performing base station functionality, may be implemented in an aggregated or disaggregated architecture. For example, a base station (such as a Node B (NB), evolved NB (eNB), NR base station, 5G NB, access point (AP), a transmit receive point (TRP), or a cell, etc.) may be implemented as an aggregated base station (also known as a standalone base station or a monolithic base station) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 2C:
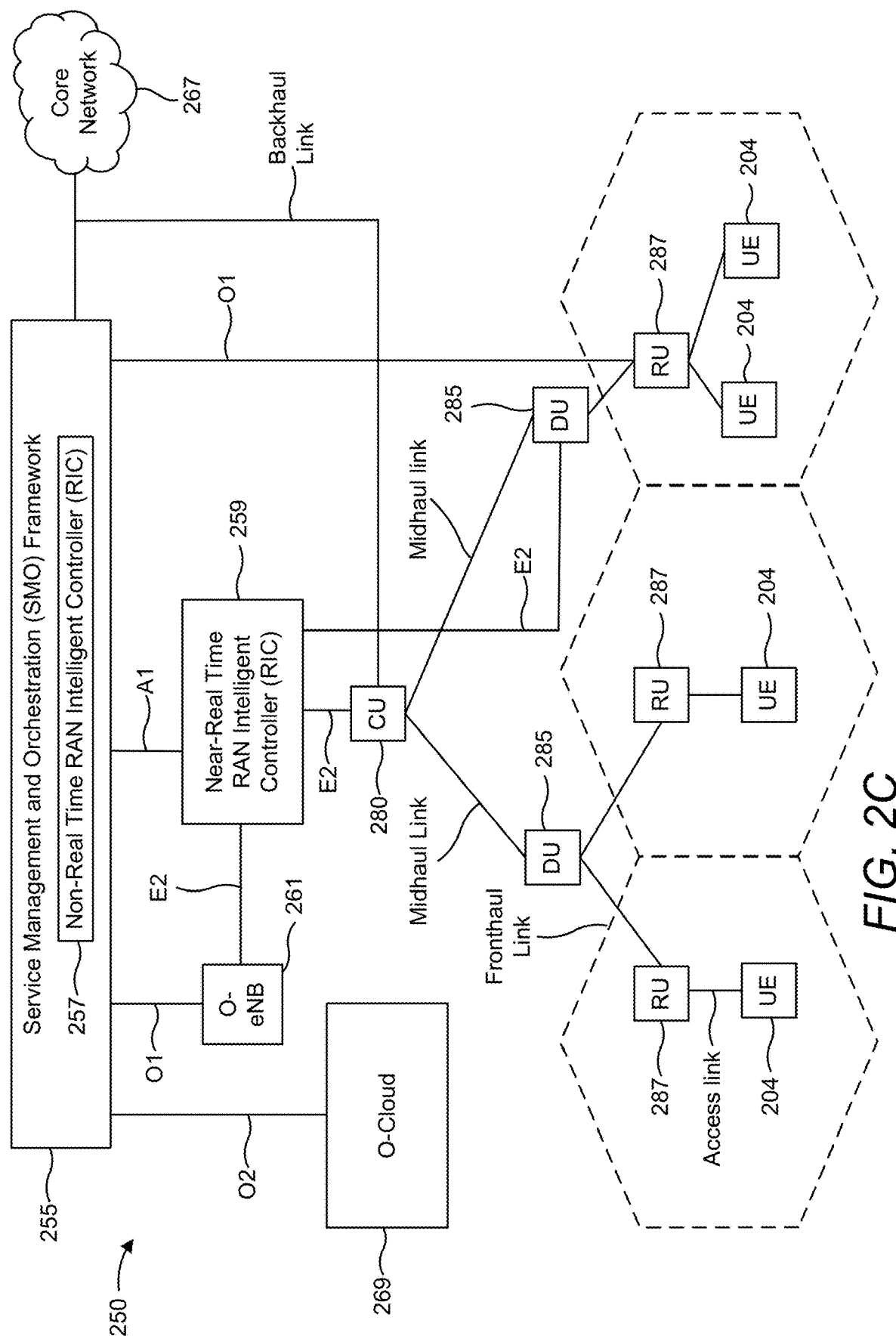

FIG. 2C illustrates an example disaggregated base station architecture 250, according to aspects of the disclosure. The disaggregated base station architecture 250 may include one or more central units (CUs) 280 (e.g., gNB-CU 226) that can communicate directly with a core network 267 (e.g., 5GC 210, 5GC 260) via a backhaul link, or indirectly with the core network 267 through one or more disaggregated base station units (such as a Near-Real Time (Near-RT) RAN Intelligent Controller (RIC) 259 via an E2 link, or a Non-Real Time (Non-RT) RIC 257 associated with a Service Management and Orchestration (SMO) Framework 255, or both). A CU 280 may communicate with one or more distributed units (DUs) 285 (e.g., gNB-DUs 228) via respective midhaul links, such as an F1 interface. The DUs 285 may communicate with one or more radio units (RUs) 287 (e.g., gNB-RUs 229) via respective fronthaul links. The RUs 287 may communicate with respective UEs 204 via one or more radio frequency (RF) access links. In some implementations, the UE 204 may be simultaneously served by multiple RUs 287.

Each of the units, i.e., the CUs 280, the DUs 285, the RUs 287, as well as the Near-RT RICs 259, the Non-RT RICs 257 and the SMO Framework 255, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 280 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 280. The CU 280 may be configured to handle user plane functionality (i.e., Central Unit-User Plane (CU-UP)), control plane functionality (i.e., Central Unit-Control Plane (CU-CP)), or a combination thereof. In some implementations, the CU 280 can be logically split into one or more CU-UP units and one or more CU-CP units. The CU-UP unit can communicate bidirectionally with the CU-CP unit via an interface, such as the E1 interface when implemented in an O-RAN configuration. The CU 280 can be implemented to communicate with the DU 285, as necessary, for network control and signaling.

The DU 285 may correspond to a logical unit that includes one or more base station functions to control the operation of one or more RUs 287. In some aspects, the DU 285 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 285 may further host one or more low PHY layers. Each layer (or module) can be implemented with an interface configured to communicate signals with other layers (and modules) hosted by the DU 285, or with the control functions hosted by the CU 280.

Lower-layer functionality can be implemented by one or more RUs 287. In some deployments, an RU 287, controlled by a DU 285, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 287 can be implemented to handle over the air (OTA) communication with one or more UEs 204. In some implementations, real-time and non-real-time aspects of control and user plane communication with the RU(s) 287 can be controlled by the corresponding DU 285. In some scenarios, this configuration can enable the DU(s) 285 and the CU 280 to be implemented in a cloud-based RAN architecture, such as a vRAN architecture.

The SMO Framework 255 may be configured to support RAN deployment and provisioning of non-virtualized and virtualized network elements. For non-virtualized network elements, the SMO Framework 255 may be configured to support the deployment of dedicated physical resources for RAN coverage requirements which may be managed via an operations and maintenance interface (such as an O1 interface). For virtualized network elements, the SMO Framework 255 may be configured to interact with a cloud computing platform (such as an open cloud (O-Cloud) 269) to perform network element life cycle management (such as to instantiate virtualized network elements) via a cloud computing platform interface (such as an O2 interface). Such virtualized network elements can include, but are not limited to, CUs 280, DUs 285, RUs 287 and Near-RT RICs 259. In some implementations, the SMO Framework 255 can communicate with a hardware aspect of a 4G RAN, such as an open eNB (O-eNB) 261, via an O1 interface. Additionally, in some implementations, the SMO Framework 255 can communicate directly with one or more RUs 287 via an O1 interface. The SMO Framework 255 also may include a Non-RT RIC 257 configured to support functionality of the SMO Framework 255.

The Non-RT RIC 257 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 259. The Non-RT RIC 257 may be coupled to or communicate with (such as via an A1 interface) the Near-RT RIC 259. The Near-RT RIC 259 may be configured to include a logical function that enables near-real-time control and optimization of RAN elements and resources via data collection and actions over an interface (such as via an E2 interface) connecting one or more CUs 280, one or more DUs 285, or both, as well as an O-eNB, with the Near-RT RIC 259.

In some implementations, to generate AI/ML models to be deployed in the Near-RT RIC 259, the Non-RT RIC 257 may receive parameters or external enrichment information from external servers. Such information may be utilized by the Near-RT RIC 259 and may be received at the SMO Framework 255 or the Non-RT RIC 257 from non-network data sources or from network functions. In some examples, the Non-RT RIC 257 or the Near-RT RIC 259 may be configured to tune RAN behavior or performance. For example, the Non-RT RIC 257 may monitor long-term trends and patterns for performance and employ AI/ML models to perform corrective actions through the SMO Framework 255 (such as reconfiguration via O1) or via creation of RAN management policies (such as A1 policies).

Figure 3A:
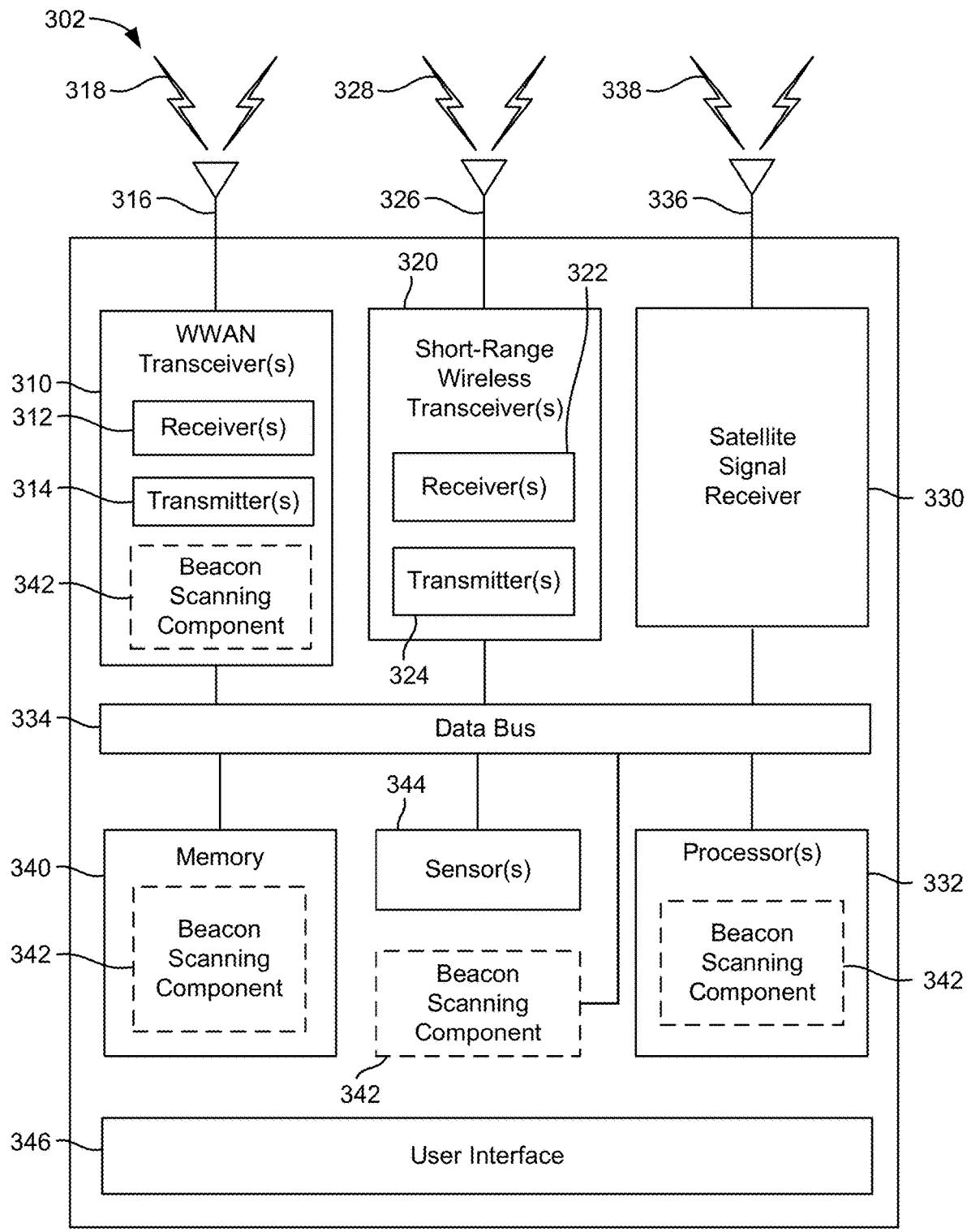
FIGS. 3A, 3B, and 3C are simplified block diagrams of several sample aspects of components that may be employed in a user equipment (UE), abase station, and a network entity, respectively, and configured to support communications as taught herein.
Figure 3B:
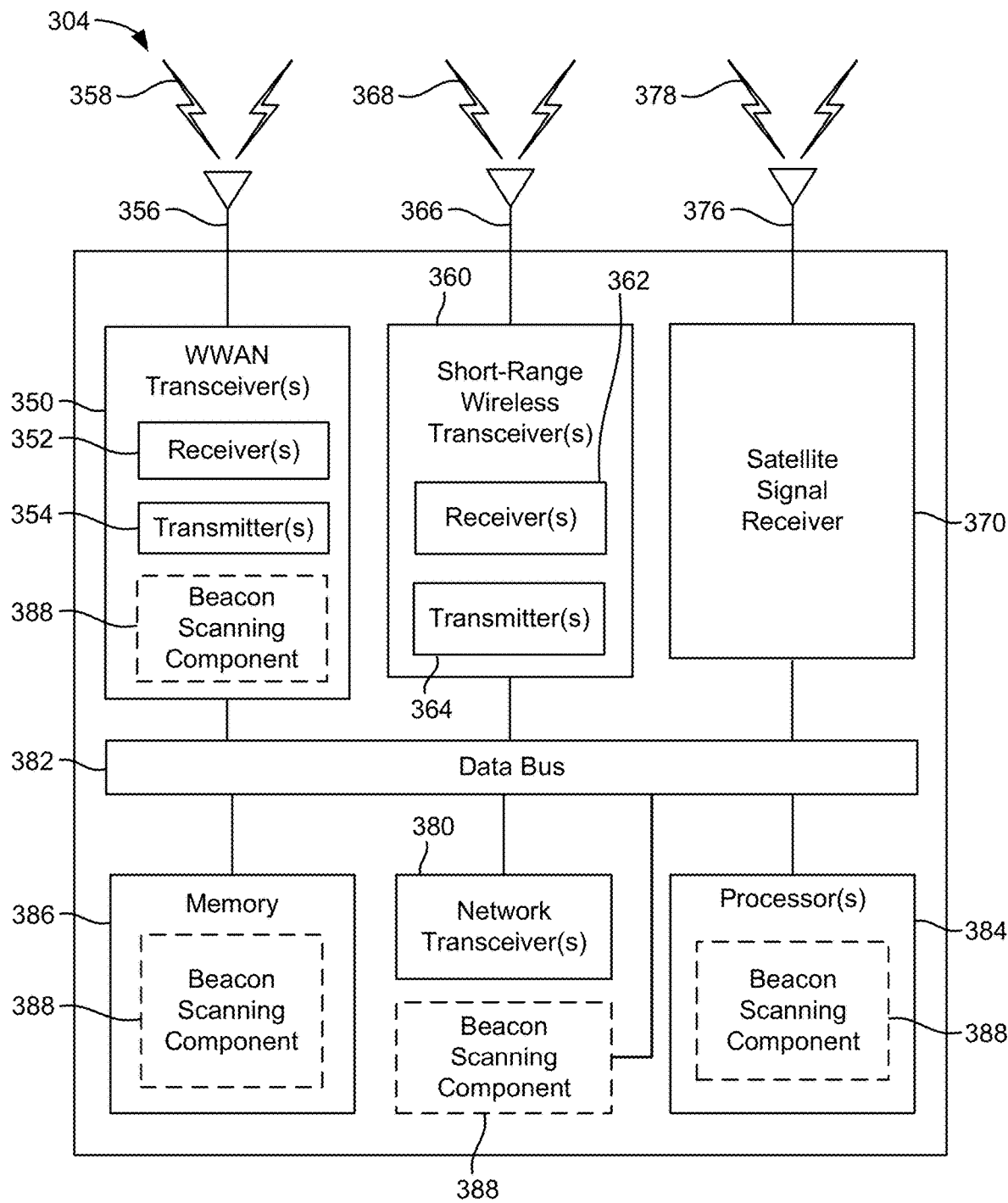
Figure 3C:
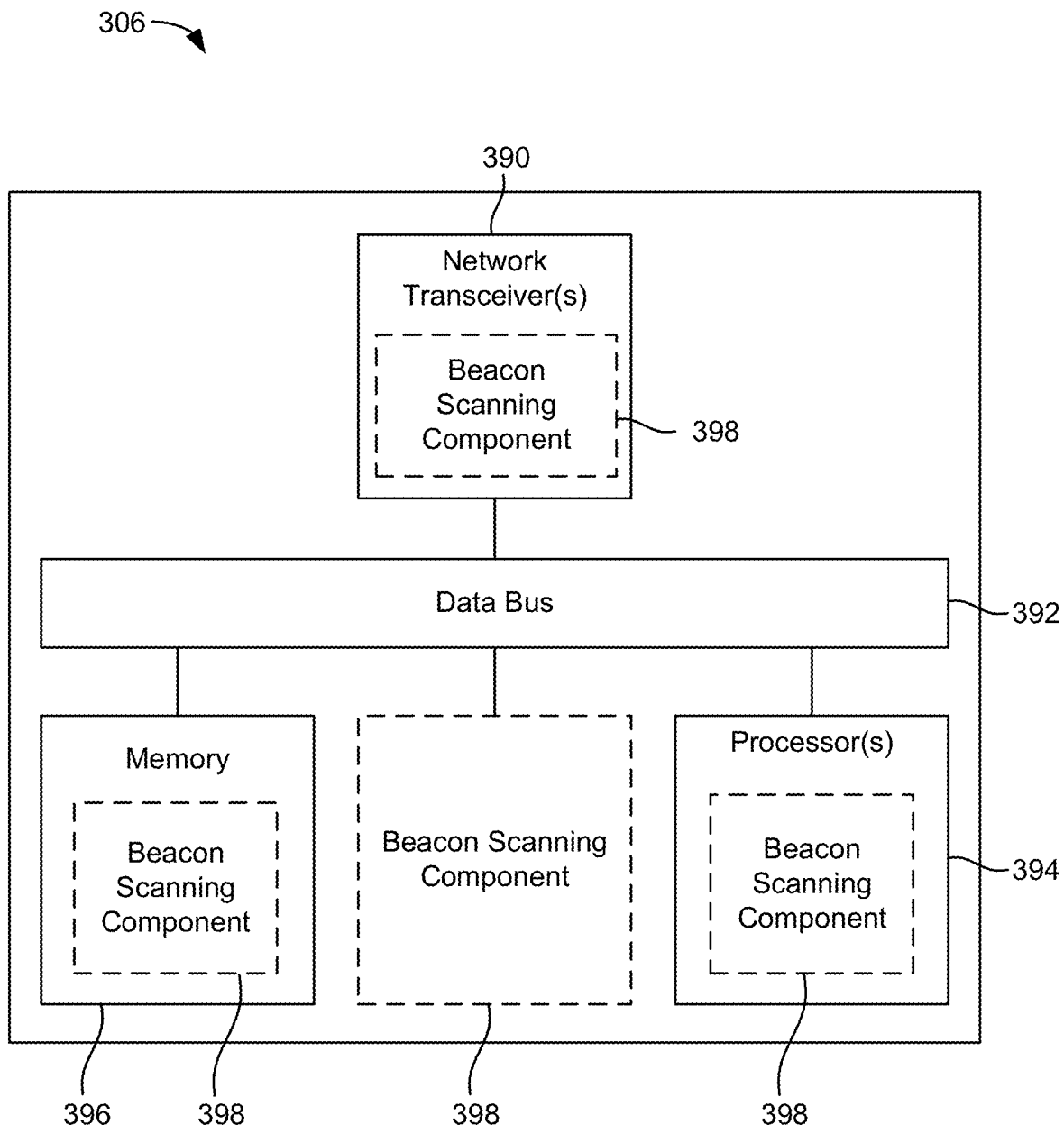

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the operations described herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), ultra-wideband (UWB), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, UWB transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include beacon scanning component 342, 388, and 398, respectively. The beacon scanning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the beacon scanning component 342, 388, and 398 may be external to the processors 332, 384, and 394 (e.g., part of a modem processing system, integrated with another processing system, etc.). Alternatively, the beacon scanning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the beacon scanning component 342, which may be, for example, part of the one or more WWAN transceivers 310, the memory 340, the one or more processors 332, or any combination thereof, or may be a standalone component. FIG. 3B illustrates possible locations of the beacon scanning component 388, which may be, for example, part of the one or more WWAN transceivers 350, the memory 386, the one or more processors 384, or any combination thereof, or may be a standalone component. FIG. 3C illustrates possible locations of the beacon scanning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a microelectrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the downlink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite signal receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the beacon scanning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

Various types of wireless energy charging capabilities are implemented on UEs (e.g., electromagnetic charging such as Qi wireless charging, wind-based charging, solar-based charging, vibration-based charging, etc.). Another type of wireless charging is radio frequency for energy harvesting (RF-EH). RF sources can provide a controllable and substantially constant energy transfer over distance for wireless energy charging-capable UEs. In a fixed wireless energy charging network, the harvested energy is predictable and relatively stable over time due to fixed distance.

Figure 4:
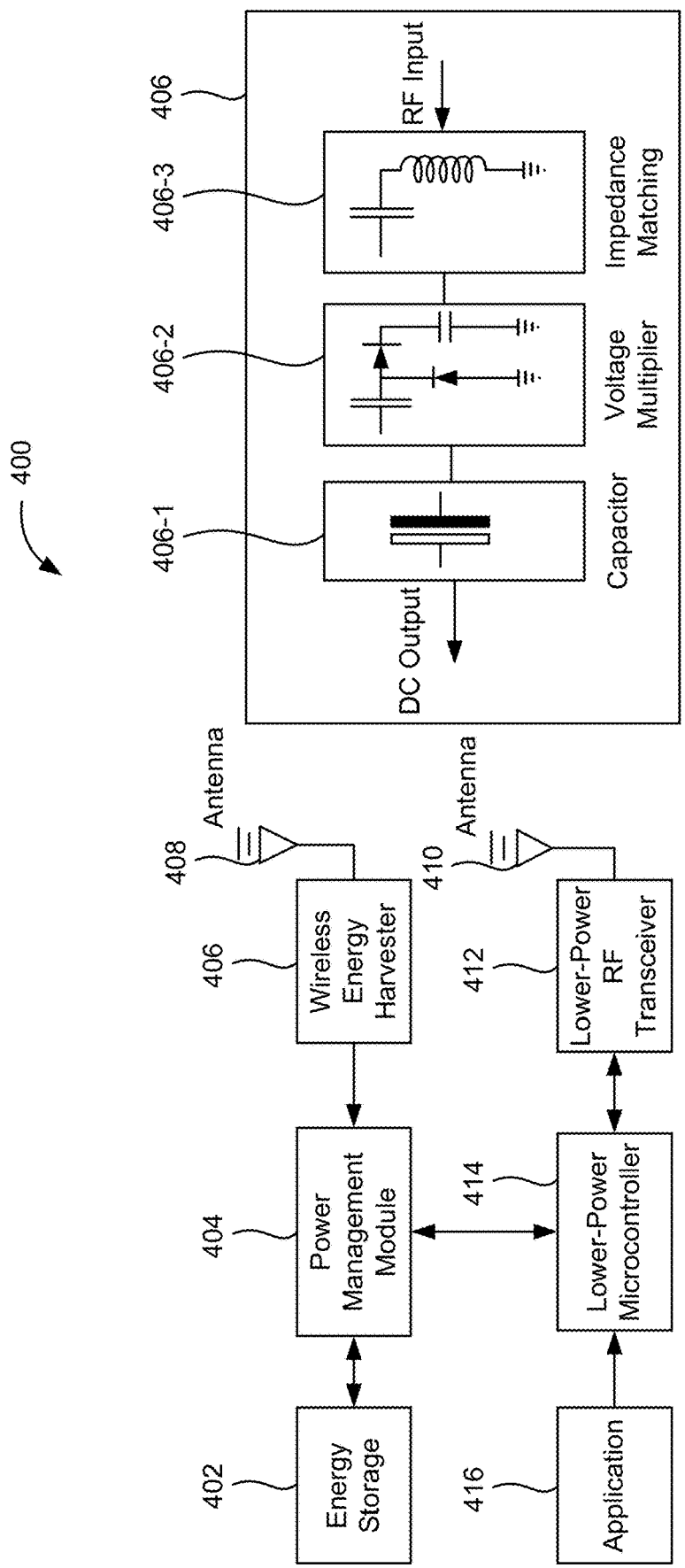
FIG. 4 illustrates a wireless energy charging-capable device in accordance with an aspect of the disclosure

FIG. 4 illustrates a wireless energy charging-capable (e.g., RF-EH-capable) device 400 in accordance with an aspect of the disclosure.

In some designs, the wireless energy charging-capable device 400 may correspond to a passive device (e.g., a device that turns on briefly when wireless energy is being provided, and then transitions to a passive state or sleep state when wireless energy is not being provided).

The wireless energy charging-capable device 400 includes an energy storage unit 402 (e.g., a battery, a capacitor, etc.), a power management module 404 (e.g., which decides whether to store the electricity obtained from a wireless energy source or to use it for information transmission immediately), wireless energy charging/capturing circuitry 406 (e.g., to collect RF signals and convert them into electricity), antennas 408-410, a lower-power RF transceiver 412 (e.g., for information transmission or reception), a lower-power microcontroller 414 (e.g., to process data), and an application 416. The wireless energy charging/capturing circuitry 406 includes a capacitor 406-1, a voltage multiplier 406-2 and an impedance matching module 406-3. Generally, the modules 402-408 are associated with wireless energy charging/capturing, while the modules 410-416 are associated with communication. The wireless energy charging-capable device 400 constitutes an example of a separated receiver architecture, whereby antenna 408 is dedicated to wireless energy charging/capturing circuitry 406, while antenna 410 is dedicated to communication circuitry (e.g., without antenna re-use, or switching or power-splitting wireless energy charging/capturing circuitry and communication circuitry). In some designs, the modules 402-408 are associated with wireless energy charging/capturing and may further include a clock component for calibration of an internal oscillator rather than a time transfer function (e.g., so that the wireless energy charging-capable device 400 may be capable of triggering transmission of a signal, such a beacon, at a later stage). In other designs, the modules 402-408 may include the clock component for calibration and a time transfer component to facilitate the time transfer function. For example, in addition to supplying the clock (which in itself could also be collected from other source(s)), the wireless energy source may also transmit a schedule which will drive a Beacon transmission—and thus could also help in supplying a beacon scanning window, as will be described below in more detail. Hence, in an aspect, the wireless energy charging-capable device 400 may (in addition to providing wireless energy) be capable of providing (via wireless energy transmission) providing a clock transfer for purpose of OSC calibration, a time transfer (e.g., via some communication protocol), or both. In some designs, the wireless energy charging rate is offset by a wireless energy leakage rate (e.g., a charging rate of 2 mAh/sec minus a leakage rate of 0.1 mAh/sec results in a net charging rate of 1.9 mAh/sec). In other designs, the wireless energy charging rate and the wireless energy leakage rate may be separate parameters, with the leakage rate also being factored into the time estimation of the beacon transmission.

One example implementation of a communications system is an inventory (or asset) tracking system. For example, asset tracking systems may be deployed in warehouses, retail store spaces, and so on. For example, pallets include cases and totes may be assembled at distribution centers and then dispatched to specific retail stores. Once at a retail store, the pallets are broken down into cases and totes, that can be immediately moved to the shop floor for item level placement on shelves or re-stocking. Cases and totes can also be stored in backroom for later dispatch. As used herein, an "asset" is intended to be broadly interpreted, and may correspond to an individual or single product, a crate containing multiple products (e.g., at a warehouse or distribution center before being unpackaged), and so on.

Real-time tracking of asset location (e.g., from pallet at distribution center to pallet at retail store to shelf at retail store, etc.) is difficult in current asset tracking systems. In particular, the ability for a retailer to determine precisely (or to a given degree of precision, e.g., such as knowledge of a count or quantity of assets, etc.), the stock currently available to physical customers ("brick & mortar" stores) is a difficult objective to achieve. Providing this information to a retailer may be of great value. For example, real-time tracking of asset count may help to facilitate updating of stock dynamically, on-demand or periodically, to improve logistics, to develop of more revenue streams, reduce waste and improve a "just in time" approach, leading to avoidance of empty shelves as well as unnecessary consumption of real-estate in backroom storage.

In addition to quantitative information about which products are in a store, knowledge of asset placement throughout the space and, accuracy of the expected deployment (plan-o-gram) with reality (real-o-gram) may also be important and valuable information to supply to any retailers. For example, identification of "displaced" items (e.g., customer picking up item and moving them out of basket somewhere else in store) through the store allows retailer to recover and re-organize.

Moreover, aside from location, state information may also be retrieved (e.g., related to any device status information, including location but potentially including other state information such as battery status in case of active BLE labels, any other type of device health information, sensor information, etc.). For example, an asset may be equipped with sensor(s) that measure parameters such as freshness (e.g., for food items, based on detection of noxious gases indicative of rot or progress of maturation), historical sensors (e.g., for frozen foods, such sensors may measure an amount of time that the asset was kept in an environment exceeding a temperature threshold), and so on.

Figure 5:
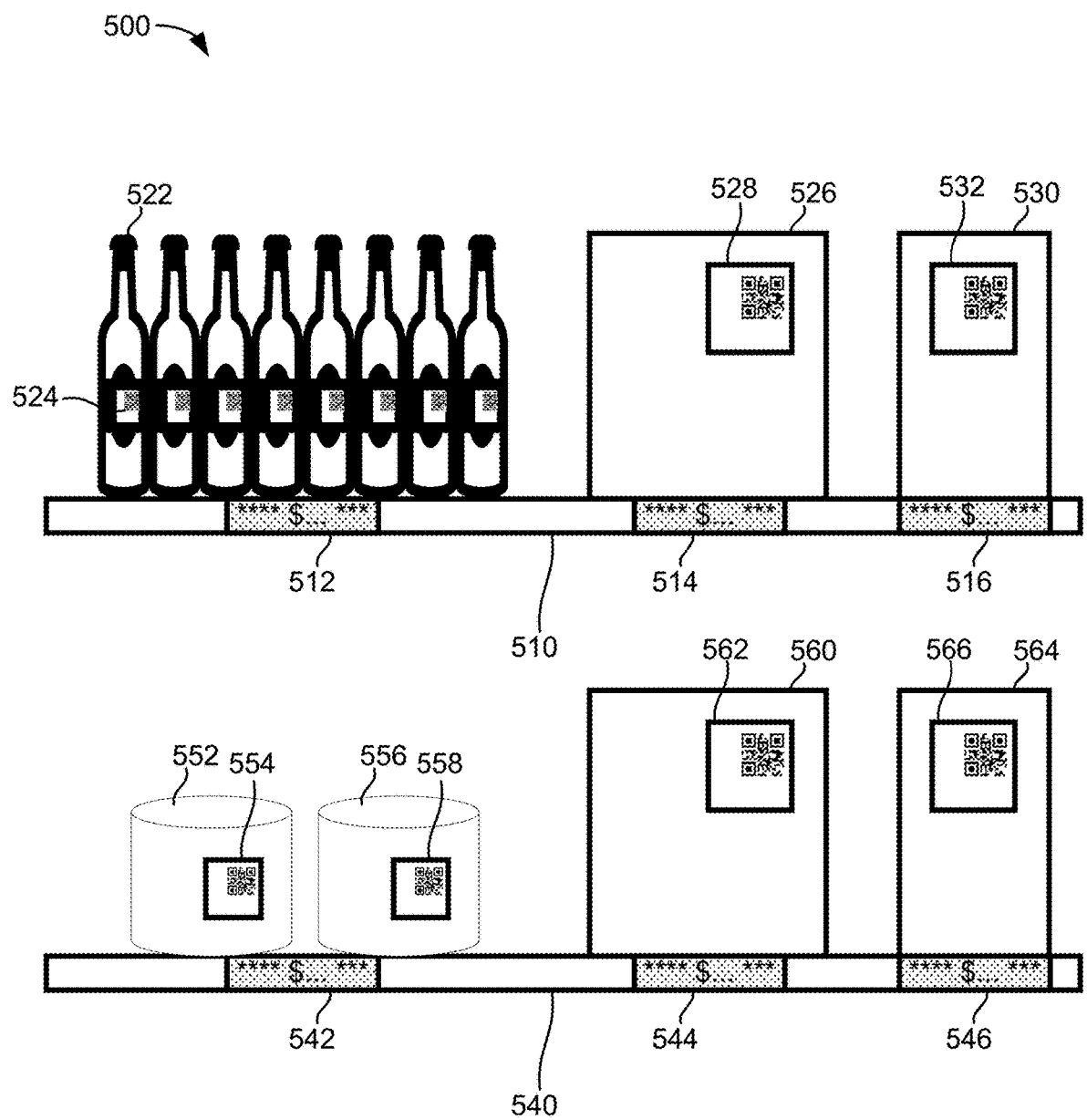
FIG. 5 illustrates an in-store part of an electronic label system, in accordance with aspects of the disclosure.

One example of an asset tracking system may rely upon electronic shelf label (ESL) infrastructure. FIG. 5 illustrates an in-store part 500 of an ESL system, in accordance with aspects of the disclosure. In FIG. 5, the in-store part 500 of the ESL system includes a shelf 510 with rail displays 512, 514 and 516. In some designs, the rail displays (referred to herein as ESLs, which may present information via a display such as a liquid crystal display (LCD), e-ink, etc.) 512, 514 and 516 may be coupled to a controller (not shown) that controls the ESLs 512, 514 and 516. The ESL 512 is proximate to a shelf location that stores bottles 522 with BLE labels 524, the ESL 514 is proximate to a shelf location that a box 526 with BLE label 528, and ESL 516 is proximate to a shelf location that stores a box 530 with BLE label 532. In FIG. 5, the in-store part 500 of the ESL system further includes a shelf 540 with ESLs 542, 544 and 546. In some designs, the ESLs 542, 544 and 546 may be coupled to a controller (not shown) that controls the ESLs 542, 544 and 546. The ESL 542 is proximate to a shelf location that stores bins 552 and 556 with BLE labels 554 and 558, respectively, the ESL 544 is proximate to a shelf location that a box 560 with BLE label 562, and ESL 546 is proximate to a shelf location that stores a box 564 with BLE label 566.

In some designs, the ESLs 512, 514, 516, 542, 544 and 546 may be implemented as "true" ESLs (e.g., controlled via an RF element incorporated within and associated with a battery) that are communicatively coupled to rail displays (e.g., limited to a small microcontroller unit (MCU) for purpose of processing commands/controls issued by a rail controller, without a radio for purpose of communication and no battery). In such designs, the ESLs and associated rail displays are not typically utilized as either asset scanning devices or wireless energy sources.

In some designs, BLE "labels" may be printed or otherwise made part of the packaging of an asset. In some designs, BLE labels may correspond to battery-less (or passive) BLE devices equipped with a wireless energy harvester and a BLE radio, or battery-powered (or active) BLE devices equipped with a small battery (e.g., 50 mAh) and a BLE radio. A passive BLE device may function similarly to an RFID tag/label, although the passive BLE device may further support a BLE protocol, a limited processing function and a limited communication function while harvesting wireless energy.

In some designs, a controller may be part of an ESL system, whereby the controller is coupled with a serial interface able to establish a wired connection with a plurality of rail displays (e-ink) attached to the rail of a shelf. In some deigns, battery capacity available at the controller may be significantly larger (e.g., 3500 mAh) than for an ESL (e.g., 345 mAh for radio).

Figure 6:
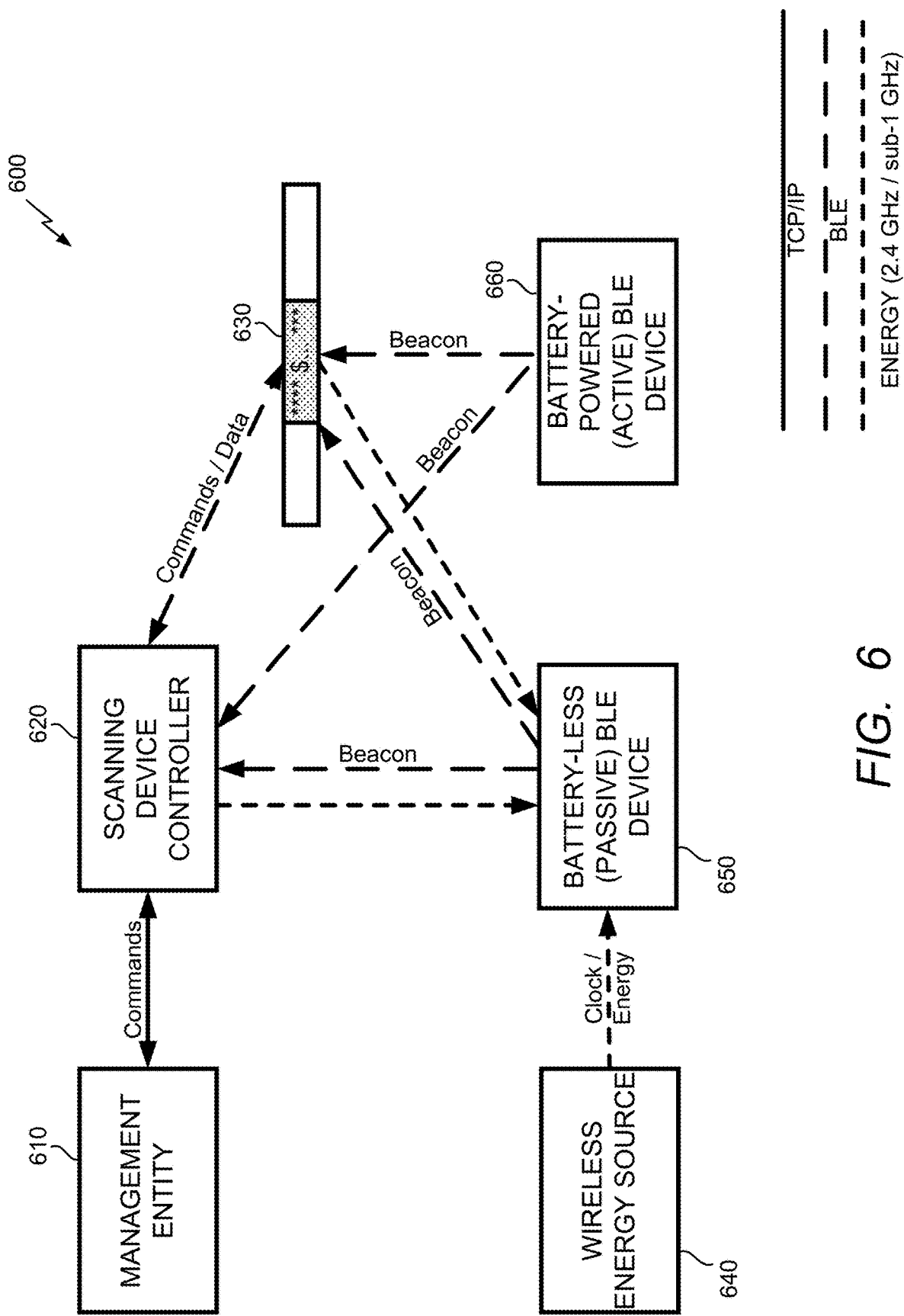
FIG. 6 illustrates electronic shelf label (ESL) system infrastructure, in accordance with aspects of the disclosure.

FIG. 6 illustrates ESL system infrastructure 600, in accordance with aspects of the disclosure. The ESL system infrastructure 600 includes a management entity 610, a scanning device controller 620, an ESL 630, a wireless energy source 640, a battery-less (or passive) BLE device 650, and a battery-powered (active) BLE device 660.

Referring to FIG. 6, in some designs, the management entity 610 may be a cloud-based server that manages groups of ESLs (such as ESL 630) via scanning device controllers (such as the scanning device controller 620). In some designs, the scanning device controller 620 provides a communications link between the management entity 610 and the ESL 630 (e.g., management entity 610 may transmit commands to the ESL 630 via the scanning device controller 620). For example, the scanning device controller 620 may periodically transmit a data packet or advertisement (e.g., once every 12.5 ms for 625 us) and wait for a response. In some designs, the scanning device controller 620 may establish a connection with up to a certain number (e.g., three) of ESLs concurrently. In some designs, the scanning device controller 620 may for BLE broadcasts (beacons), sporadically and opportunistically. In a further aspect, the scanning device controller 620 may act as a point of translation between an Internet-based communications protocol (such as TCP/IP, HTTP, etc.) to a specific BLE-based solution (e.g., ESL protocol). The scanning device controller 620, in turn, will connect may connected to the ME 610 which is responsible to the overall management of the various end-entities (e.g., ESLs).

Referring to FIG. 6, in some designs, the ESL 630 may output customer price/information pertinent to products against which they are co-located (e.g., see above discussion with respect to FIG. 5). In some designs, the ESL 630 may be equipped with a BLE radio capable of receiving commands from the management entity 610 via the scanning device controller 620, and transmitting responses to the management entity 610 via the scanning device controller 620. Furthermore, in some designs, the ESL 630 may have the capability to scan beacon(s) from BLE labels via active scanning. A variation of this aspect is the rail controller, whereby one radio is shared amongst many Display.

Referring to FIG. 6, the battery-less (or passive) BLE device 650 may be implemented as a battery-less label that will harvest "ambient" energy from such solar, light, vibration, temperature gradient, radio frequency. However, the battery-less (or passive) BLE device 650 may also harvest "dedicated" energy from a wireless energy source. The battery-powered (or active) BLE device 660 by contrast has limited battery capacity (e.g., in a printable format).

Referring to FIG. 6, the battery-powered (or active) BLE device 660 is configured to be in a dormant state so as to conserve energy, and may be activated with specific wake-up radio signals from target scanning device controllers such as the scanning device controller 620. In some designs, a wake-up radio signal may be linked to a wireless energy source (e.g., this does not have to be co-located with the scanning device controller, but rather may be co-located with the battery-less BLE device). Active BLE devices are generally well-known and are frequently used in ESL tracking infrastructure.

For example, active BLE devices may transmit beacons that are captured by scanners (e.g., ESLs) at known locations so as to establish a proximity determination. For example, the wake-up radio configuration may reduce or remove a latency requirement (e.g., the strength of the received wake-up radio signal (in terms of energy captured over a given amount of time) may be used to tune (in time) the provided response, which may result in the equivalent behavior to battery-less BLE devices.) In some designs, scheduling of transmissions may be achieved from internal timers or detection of external signals monitored by the active BLE device itself. In an aspect, active BLE devices supporting ESL protocol brings a plurality of benefits:

Active BLE devices only consume energy to track scanning device controller signal, Active BLE devices may be directed by a management entity to start beaconing and/or scanning (e.g., on a need basis) to further extend battery life, The scanning device controller may report active BLE device beaconing and thus infer proximity to the scanning device controller, The management entity and/or the scanning device controller may instruct active BLE devices to either beacon or scan in a synchronized manner, and Active BLE device scanning will provide other active BLE device and/or ESL proximity, thereby allowing more granular location.

Aspects of the disclosure are directed to scheduling of beacon scanning windows based upon a time estimate of when wireless energy charging-capable device(s) coupled to asset(s) are expected to transmit beacons. In a particular aspect, the time estimate may be based on distance(s) between the wireless energy source and a scanning device proximate to the wireless energy charging-capable device(s). Such aspects may provide various technical advantages, such as reducing power consumption at the scanning device (e.g., more focused scanning based on beacon transmission timing estimate), reducing power consumption at the battery-powered (active) BLE device(s) (e.g., may transmit with reduced power to reach proximate ESL instead of the more remote AP), improving detection of beacons in an asset tracking system, and so on.

Figure 7:
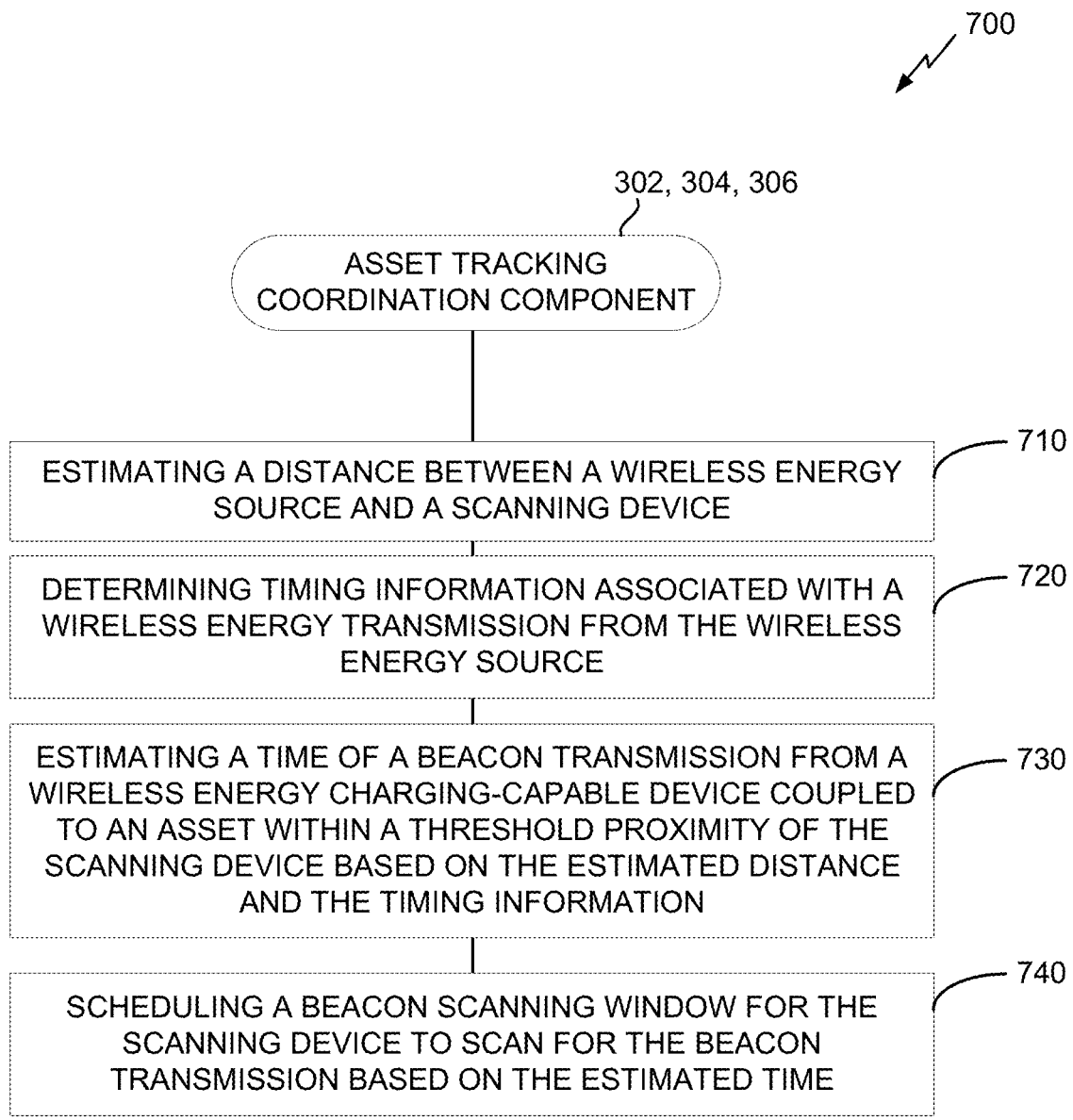
FIG. 7 illustrates an exemplary process according to aspects of the disclosure.

FIG. 7 illustrates an exemplary process 700, according to aspects of the disclosure. In an aspect, the process 700 may be performed by an asset tracking coordination component (e.g., UE 302, a BS or gNB such as BS 304 or an O-RAN component such as RU, DU or CU, a server such as network entity 306, etc.). In a further example, the asset tracking coordination component may correspond to a scanning device controller such as scanning device controller 620 or a management entity such as management entity 610.

Referring to FIG. 7, at 710, the asset tracking coordination component (e.g., processor(s) 332 or 384 or 394, beacon scanning component 342 or 388 or 398, etc.) estimates a distance between a wireless energy source and a scanning device. In an aspect, the asset tracking coordination component may comprise (or correspond) to the scanning device. In another aspect, the asset tracking coordination component and the scanning device may be implemented as different components (e.g., scanning device controller and ESL(s)). In an example, the asset tracking coordination component corresponds to an electronic shelf label (ESL) scanning device controller, and the wireless energy charging-capable device corresponds to a passive Bluetooth low energy (BLE) label Referring to FIG. 7, at 720, the asset tracking coordination component (e.g., processor(s) 332 or 384 or 394, beacon scanning component 342 or 388 or 398, etc.) determines timing information associated with a wireless energy transmission from the wireless energy source. For example, the timing information may correspond to a schedule at which the wireless energy source is expected to provide wireless energy proximate to a wireless energy charging-capable device coupled to an asset within a threshold proximity of the scanning device. In some designs, the timing information may be scheduled (or coordinated) by the asset tracking coordination component. In other designs, the timing information may be scheduled (or coordinated) a different component, which then reports the timing information to the asset tracking coordination component.

Referring to FIG. 7, at 730, the asset tracking coordination component (e.g., processor(s) 332 or 384 or 394, beacon scanning component 342 or 388 or 398, etc.) estimates a time of a beacon transmission from a wireless energy charging-capable device coupled to an asset within a threshold proximity of the scanning device based on the estimated distance and the timing information. For example, the time estimate of 720 may be based on an expectation of when the wireless energy charging-capable device is expected to be charged sufficiently so as to transmit the beacon.

Referring to FIG. 7, at 740, the asset tracking coordination component (e.g., processor(s) 332 or 384 or 394, beacon scanning component 342 or 388 or 398, etc., transmitter 314 or 324 or 354 or 364, network transceiver(s) 380 or 390) schedules a beacon scanning window for the scanning device to scan for the beacon transmission based on the estimated time.

Figure 8:
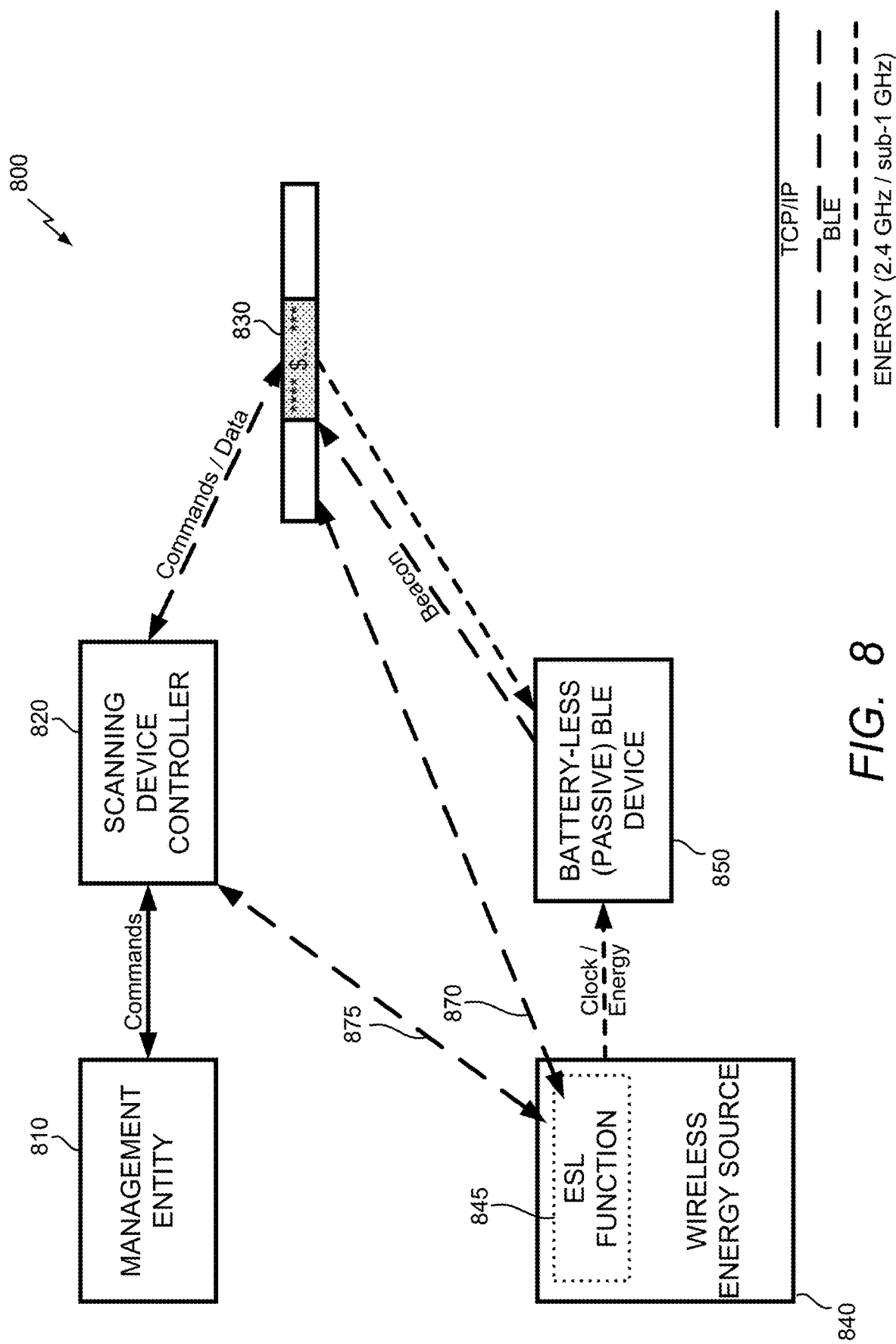
FIG. 8 illustrates an example ESL system infrastructure that is based on the process of FIG. 7, in accordance with aspects of the disclosure.

FIG. 8 illustrates an example ESL system infrastructure 800 that is based on the process 700 of FIG. 7, in accordance with aspects of the disclosure. The ESL system infrastructure 800 includes a management entity 810, a scanning device controller 820, an ESL 830, a wireless energy source 840, and a battery-less (or passive) BLE device 850. While not depicted expressly, battery-powered (active) BLE device(s) may also be part of the ESL system infrastructure 800, similar to FIG. 6.

Referring to FIG. 8, unlike the ESL system infrastructure 600 of FIG. 6, the wireless energy source 840 includes an ESL function 845 that facilitates ESL coordination via BLE communications link 870. In an aspect, such coordination may facilitate the asset tracking coordination component to determine the timing information associated with the wireless energy transmission from the wireless energy source at 720 of FIG. 7. In other designs, the wireless energy source 840 may be on-boarded with the scanning device controller 820, and the scanning device controller 820 may direct the wireless energy source 840 with respect to schedule of energizing via BLE communications link 875.

Figure 9:
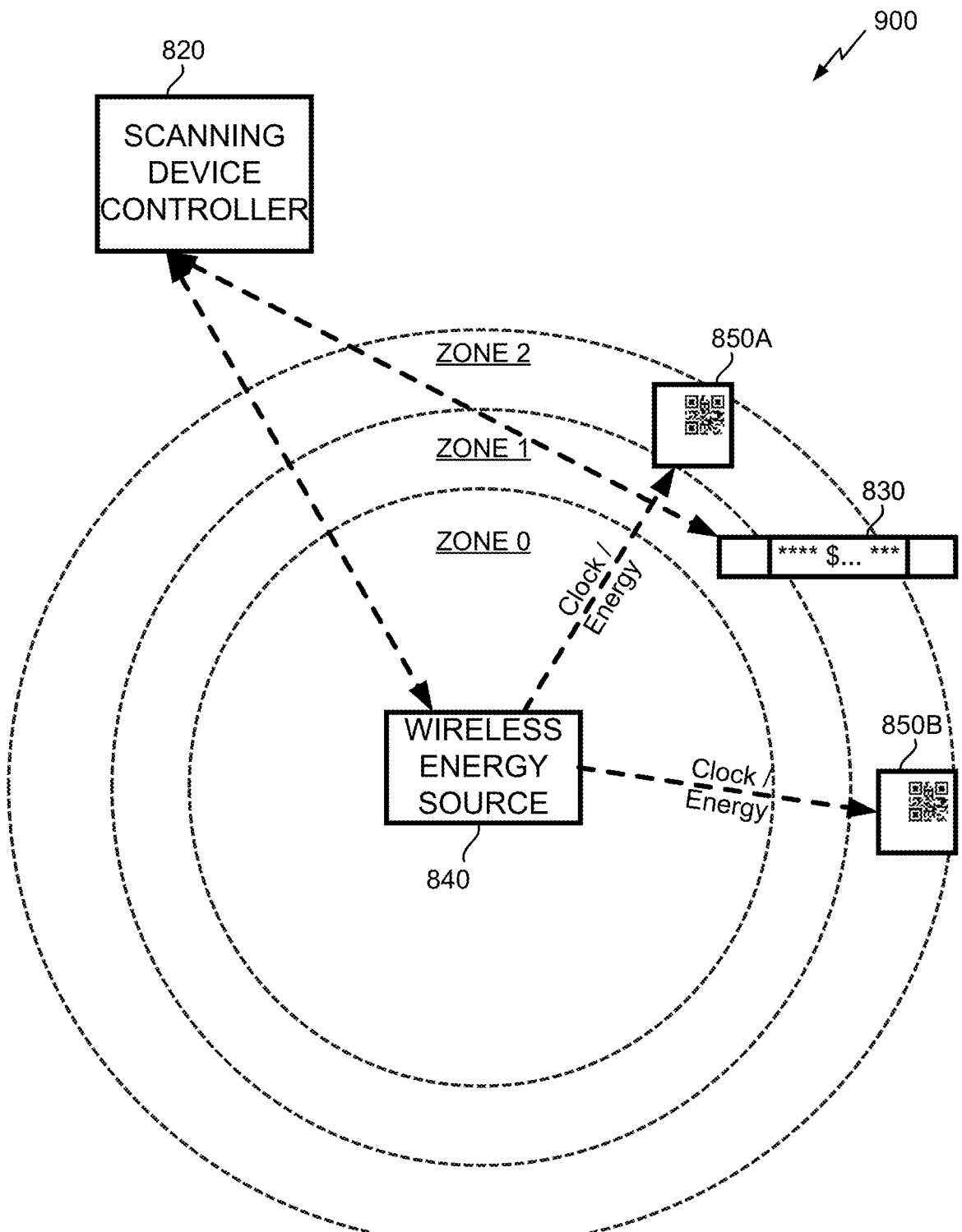
FIG. 9 illustrates an example implementation of the process of FIG. 7, in accordance with aspects of the disclosure.

FIG. 9 illustrates an example implementation 900 of the process of FIG. 7, in accordance with aspects of the disclosure. In FIG. 9, the estimated distance between the wireless energy source 840 and the ESL 830 (e.g., the scanning device) is represented as a plurality of zones denoted as zones 0, 1 and 2. Generally, the further away the scanning device is from the wireless energy source, the longer it will take for proximate battery-less (passive) BLE device(s) to transmit their respective beacons. In FIG. 9, battery-less (passive) BLE device(s) 850A-850B are arranged in zone 2 with the ESL 830.

For example, assume that each battery-less (passive) BLE device(s) will transmit a beacon once sufficient amount of energy has been harvested. Synchronisation between the wireless energy source 840 and the and the scanning device controller 820 also permits associated ESL(s) (with the same AP) to schedule scanning as a function of distance between ESL and the wireless energy source 840—e.g., thus only collecting battery-less (passive) BLE device(s) in their vicinities (e.g., note that in some designs this is not strictly true, as any tags placed at an equal distance to the wireless charging source 840 may transmit their respective beacon at a similar time—however, signal strength of such beacon(s) as received by the ESL 830 will provide some proximity information).

In some designs, the scanning device controller 820 may be in control of when the wireless energy source 840 (and thus ESL's scanning window) is engaged (e.g., the time of arrival of beacon with respect to the start of the energizing may determine a coarse indication of distance between battery-less BLE device(s) 850A-850B and wireless energy source 840—observations at multiple points in the system will allows for some very coarse trilateration estimations). In some designs, the proximal placement of ESL for scanning with respect to battery-less (passive) BLE device(s) offers the technical advantage reducing power consumption at the battery-less (passive) BLE device(s) (e.g., the battery-less (passive) BLE device(s) need only transmit to the closely proximate ESL near their respective shelf location(s) rather than the scanning device controller which is likely to be much further away). In some designs, while not shown expressly in FIG. 9, proximity between ESL and battery-less (passive) BLE device(s) can be further exploited, with the ESL being used as the wireless energy source, with either time multiplexing with the scanning or with other nearby ESL(s) performing the scanning.

Referring to FIG. 9, in an example, assume that battery-less (passive) BLE device(s) in zone 0 are expected to transmit beacon(s) at $t_i$, battery-less (passive) BLE device(s) in zone 1 are expected to transmit beacon(s) at $t_j$, and battery-less (passive) BLE device(s) in zone 1 are expected to transmit beacon(s) at $t_k$, whereby $t_i < t_j < t_k$. Scanning devices in zones 0, 1 and 2 may thereby have different scanning windows based on these timing estimates (e.g., scanning window for zone 0 may be defined as offsets plus/minus from $t_i$, scanning window for zone 0 may be defined as offsets plus/minus from $t_j$, and scanning window for zone 0 may be defined as offsets plus/minus from $t_{jk}$).

Referring to FIG. 7, in some designs, the asset tracking coordination component corresponds to an electronic shelf label (ESL) scanning device controller, and the wireless energy charging-capable device corresponds to a passive BLE label.

Referring to FIG. 7, in some designs, the asset tracking coordination component may further determine an expected wireless energy charging rate associated with the wireless energy charging-capable device in a candidate location area based on the distance, a power of the wireless energy transmission, and a frequency associated with the wireless energy transmission. The asset tracking coordination component may further determine an energy charging level at which the wireless energy charging-capable device is triggered to transmit the beacon transmission. In this case, the estimated time at 730 is based on the expected wireless energy charging rate (e.g., in some designs, based on the radio frequency of the wireless energy, the pulse (time) of the frequency, the pulse duration, and/or the transmission power) and the energy charging level. This aspect is depicted in FIG. 9 as noted above. In an aspect, the frequency of the wireless energy transmission may determine spacing between energy burst(s) and will enter in the computation of the time required for data accumulation (e.g., spacing of these pulses may be taken into account with respect to the battery-less BLE device's leakage).

Referring to FIG. 7, in some designs, the scanning device may include the asset tracking coordination component. In other words, the scanning device may be a physical component of the asset tracking coordination component (e.g., an ESL).

Referring to FIG. 7, in some designs, the scanning device is distinct from the asset tracking coordination component. In this case, in an aspect, the scanning device is closer to the wireless energy charging-capable device than the asset tracking coordination component. For example, the asset tracking coordination component may correspond to a scanning device controller while the scanning device may correspond to an ESL proximate to an asset with a passive BLE label on a nearby shelf. Also, in this case, the scheduling at 740 may include transmission of an indication of the beacon scanning window to the scanning device.

Referring to FIG. 7, in some designs, the scanning device is separate from the wireless energy source, as depicted in FIG. 9 as one example.

Aspects of the disclosure are further directed to a scanning device that not only scans for beacons from battery-powered (active) BLE device(s), but is also configured as a wireless energy source that provides the energy which triggers the respective beacons. Such aspects may provide various technical advantages, such as more localized wireless energy charging (e.g., charging may be performed via proximate ESL(s) instead of more remote AP(s), etc.) which may lead to reduced power consumption, more certainty in terms of beacon transmission timing (e.g., which may reduce scanning window duration and thereby also reduce power consumption) and/or scan window interval (e.g., without a need to go back and forth to asset tracking coordination component between energizing and scanning, thus a more local timing estimate), and so on.

Figure 10:
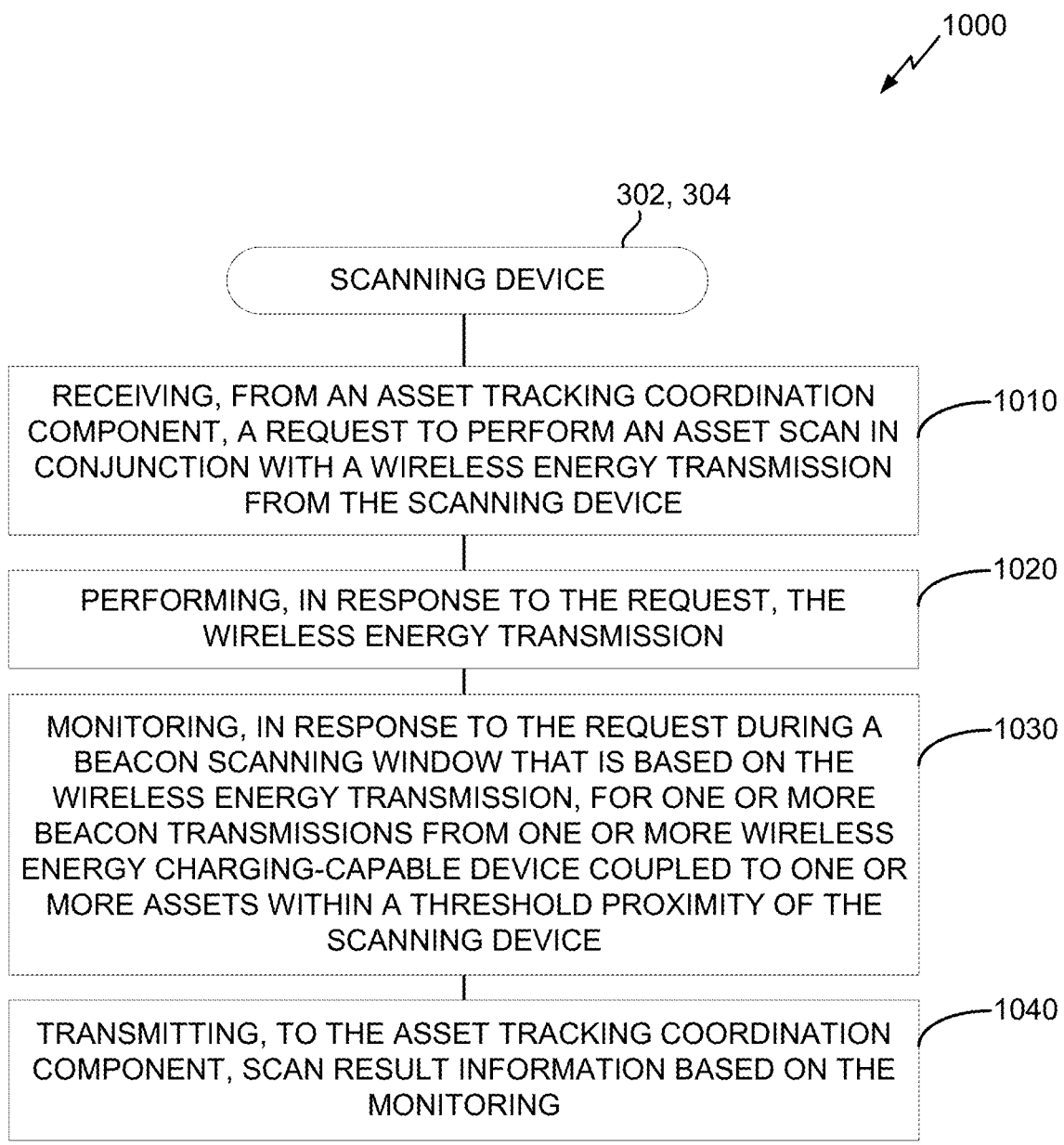
FIG. 10 illustrates an exemplary process, according to aspects of the disclosure.

FIG. 10 illustrates an exemplary process 1000, according to aspects of the disclosure. In an aspect, the process 1000 may be performed by a scanning device (e.g., a UE such as UE 302, a network component such as gNB or BS 304, etc.). In a further example, the asset tracking coordination component may correspond to a scanning device controller such as scanning device controller 620 or scanning device controller 820 or an ESL (e.g., ESL 512, 514, etc.).

Referring to FIG. 10, at 1010, the scanning device (e.g., receiver 312 or 322 or 352 or 362, network transceiver(s) 380, etc.) receives, from an asset tracking coordination component, a request to perform an asset scan in conjunction with a wireless energy transmission from the scanning device.

Referring to FIG. 10, at 1020, the scanning device (e.g., transmitter 314 or 324 or 354 or 364, beacon scanning component 342 or 388, etc.) performs, in response to the request, the wireless energy transmission. For example, the wireless energy transmission may be performed at a particular time for a particular duration at a particular transmission power level at a particular frequency, etc., as specified by the request.

Referring to FIG. 10, at 1030, the scanning device (e.g., receiver 312 or 322 or 352 or 362, processor(s) 332 or 384, beacon scanning component 342 or 388, etc.) monitors, in response to the request during a beacon scanning window that is based on the wireless energy transmission, for one or more beacon transmissions from one or more wireless energy charging-capable device coupled to one or more assets within a threshold proximity of the scanning device.

Referring to FIG. 10, at 1040, the scanning device (e.g., transmitter 314 or 324 or 354 or 364, beacon scanning component 342 or 388, network transceiver(s) 380, etc.) transmits, to the asset tracking coordination component, scan result information based on the monitoring.

Figure 11:
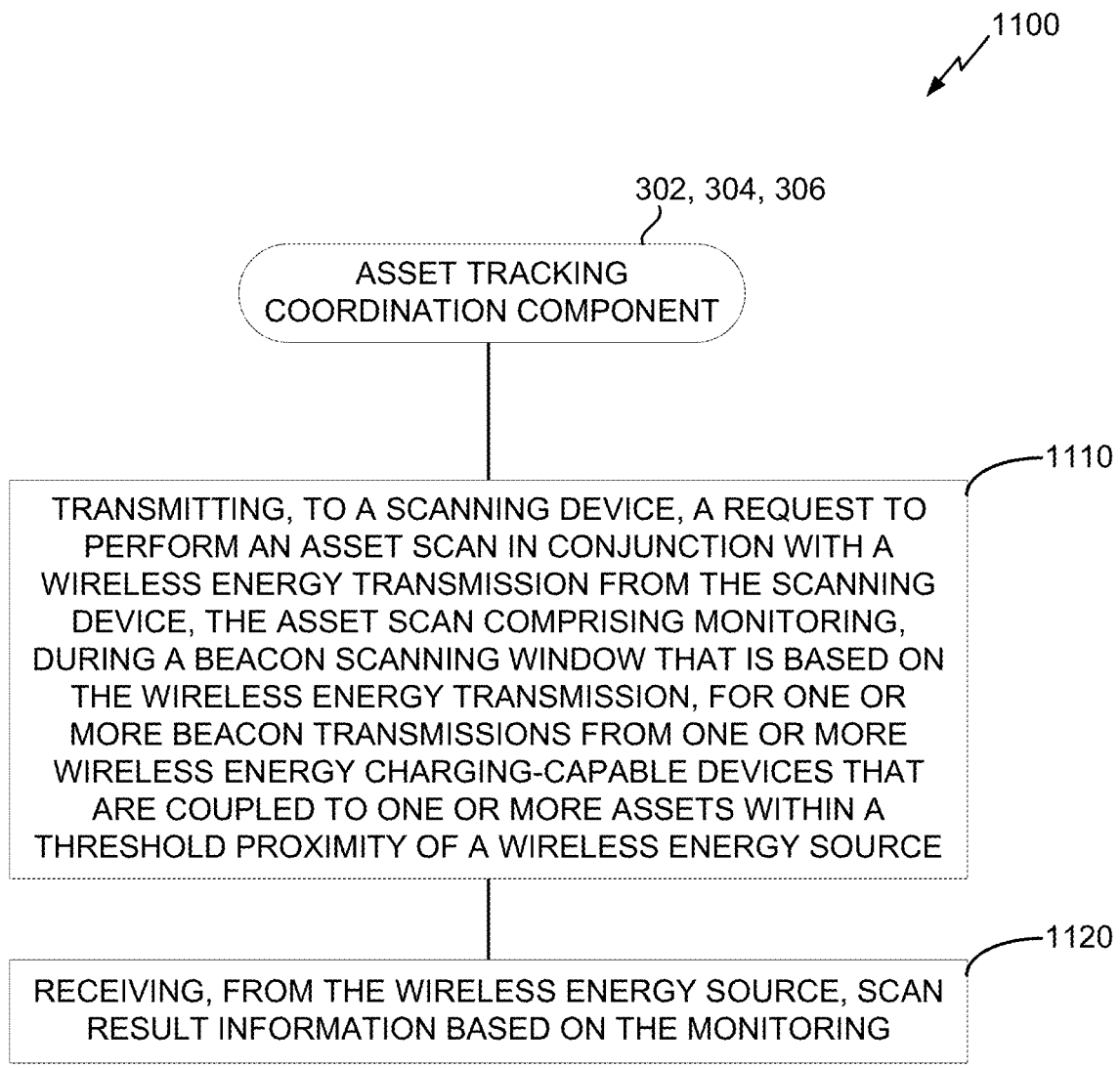
FIG. 11 illustrates an exemplary process, according to aspects of the disclosure.

FIG. 11 illustrates an exemplary process 1100, according to aspects of the disclosure. In an aspect, the process 1100 may be performed by an asset tracking coordination component (e.g., UE 302, a BS or gNB such as BS 304 or an O-RAN component such as RU, DU or CU, a server such as network entity 306, etc.). In a further example, the asset tracking coordination component may correspond to a scanning device controller such as scanning device controller 620 or a management entity such as management entity 610.

Referring to FIG. 11, at 1110, the asset tracking coordination component (e.g., transmitter(s) 314 or 324 or 354 or 364, network transceiver(s) 380 or 390, beacon scanning component 342 or 388 or 398, etc.) transmits, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source.

Referring to FIG. 11, at 1120, the asset tracking coordination component (e.g., receiver(s) 312 or 322 or 352 or 362, network transceiver(s) 380 or 390, beacon scanning component 342 or 388 or 398, etc.) receives, from the wireless energy source, scan result information based on the monitoring.

Referring to FIGS. 10-11, in some designs, the asset tracking coordination component corresponds to an electronic shelf label (ESL) scanning device controller, and the one or more wireless energy charging-capable devices correspond to one or more passive Bluetooth low energy (BLE) labels.

Referring to FIGS. 10-11, in some designs, the scanning device may include (or may correspond to) the asset tracking coordination component. In this case, the transmission/reception operations described with respect to FIG. 10-11 may be internal communications across a respective data bus.

Referring to FIGS. 10-11, in some designs, the scanning device is remote from the asset tracking coordination component. In this case, in an aspect, the scanning device is closer to the one or more wireless energy charging-capable devices than the asset tracking coordination component (e.g., which may result in reduction to power consumption at scanning device and/or the wireless energy charging-capable devices, as noted above).

Referring to FIGS. 10-11, in some designs, the scanning device may further receiver (and the asset tracking coordination component may further transmit) an indication of the beacon scanning window. In an aspect, the beacon scanning window may be determined as described above with respect to FIG. 7, in an example.

Figure 12:
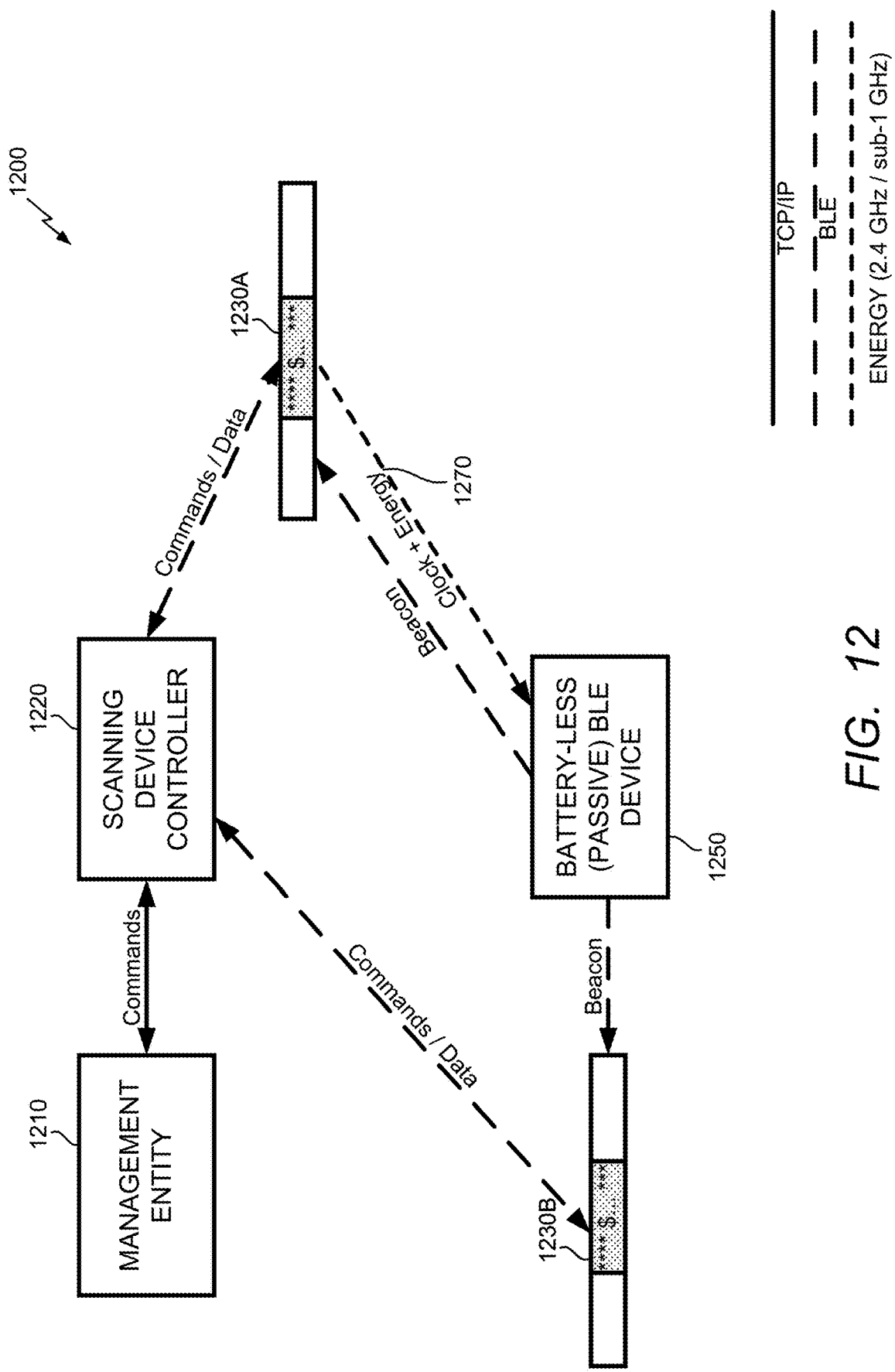
FIG. 12 illustrates an example ESL system infrastructure that is based on the processes of FIGS. 10-11, respectively, in accordance with aspects of the disclosure.

FIG. 12 illustrates an example ESL system infrastructure 1200 that is based on the processes 1000-1100 of FIGS. 10-11, respectively, in accordance with aspects of the disclosure. The ESL system infrastructure 1200 includes a management entity 1210, a scanning device controller 1220, an ESL 1230A, an ESL 1230B, and a battery-less (or passive) BLE device 1250. While not depicted expressly, battery-powered (active) BLE device(s) may also be part of the ESL system infrastructure 1200, similar to FIG. 6.

Referring to FIG. 12, unlike the ESL system infrastructure 800 of FIG. 6, a "dedicated" wireless energy source is not depicted in FIG. 12. Rather, the ESL 1230A acts as both a wireless energy source as well as a scanning device that monitors for the beacon from the battery-less (or passive) BLE device 1250 (e.g., although while ESL 1230A may have this dual capability, from time to time, the ESL 1230A may operate in scanner-only mode or energy source-only mode). The ESL 1230B by contrast operates similar to the ESL 830 of FIG. 8, whereby the ESL 1230B performs a scanning function only. Hence, some ESLs may be arranged as wireless energy sources while other ESLs are not, in some designs. In yet other designs, each ESL may be configured as both a wireless energy source and a scanning device.

In an aspect, the ESL 1230A may modify its "normal" RF pattern so as to generate wireless energy packets via a link 1270 (e.g., calibration clock signal plus energy). In some designs, scanning may be time-multiplexed with these wireless energy packets from the ESL 1230A. As noted above, in some designs, the scanning by ESLs 1230A-1230B may be coordinated by a common or shared scanning device controller that controls both ESLs 1230A-1230B.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an electrical insulator and an electrical conductor). Furthermore, it is also intended that aspects of a clause can be included in any other independent clause, even if the clause is not directly dependent on the independent clause.

Implementation examples are described in the following numbered clauses:

Clause 1. A method of operating an asset tracking coordination component, comprising: estimating a distance between a wireless energy source and a scanning device; determining timing information associated with a wireless energy transmission from the wireless energy source; estimating a time of a beacon transmission from a wireless energy charging-capable device coupled to an asset within a threshold proximity of the scanning device based on the estimated distance and the timing information; and scheduling a beacon scanning window for the scanning device to scan for the beacon transmission based on the estimated time.

Clause 2. The method of clause 1, wherein the asset tracking coordination component corresponds to an electronic shelf label (ESL) scanning device controller, and wherein the wireless energy charging-capable device corresponds to a passive Bluetooth low energy (BLE) label.

Clause 3. The method of any of clauses 1 to 2, further comprising: determining an expected wireless energy charging rate associated with the wireless energy charging-capable device in a candidate location area based on the distance, a power of the wireless energy transmission, and a frequency associated with the wireless energy transmission; and determining an energy charging level at which the wireless energy charging-capable device is triggered to transmit the beacon transmission, wherein the estimated time is based on the expected wireless energy charging rate and the energy charging level.

Clause 4. The method of any of clauses 1 to 3, wherein the scanning device comprises the asset tracking coordination component.

Clause 5. The method of any of clauses 1 to 4, wherein the scanning device is distinct from the asset tracking coordination component.

Clause 6. The method of clause 5, wherein the scanning device is closer to the wireless energy charging-capable device than the asset tracking coordination component.

Clause 7. The method of any of clauses 5 to 6, wherein the scheduling comprises transmission of an indication of the beacon scanning window to the scanning device.

Clause 8. The method of any of clauses 1 to 7, wherein the scanning device is separate from the wireless energy source.

Clause 9. A method of operating a scanning device, comprising: receiving, from an asset tracking coordination component, a request to perform an asset scan in conjunction with a wireless energy transmission from the scanning device; performing, in response to the request, the wireless energy transmission; monitoring, in response to the request during a beacon scanning window that is based on the wireless energy transmission, for one or more beacon transmissions from one or more wireless energy charging-capable device coupled to one or more assets within a threshold proximity of the scanning device; and transmitting, to the asset tracking coordination component, scan result information based on the monitoring.

Clause 10. The method of clause 9, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 11. The method of any of clauses 9 to 10, wherein the scanning device comprises the asset tracking coordination component.

Clause 12. The method of any of clauses 9 to 11, wherein the scanning device is distinct from the asset tracking coordination component.

Clause 13. The method of clause 12, wherein the scanning device is closer to the one or more wireless energy charging-capable devices than the asset tracking coordination component.

Clause 14. The method of any of clauses 12 to 13, further comprising: receiving, from the asset tracking coordination component, an indication of the beacon scanning window.

Clause 15. A method of operating an asset tracking coordination component, comprising: transmitting, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receiving, from the wireless energy source, scan result information based on the monitoring.

Clause 16. The method of clause 15, wherein the beacon scanning window is determined based on one or more estimated times of one or more beacon transmission from the one or more wireless energy charging-capable devices.

Clause 17. The method of any of clauses 15 to 16, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 18. The method of any of clauses 15 to 17, wherein the scanning device comprises the asset tracking coordination component.

Clause 19. The method of any of clauses 15 to 18, wherein the scanning device is remote from the asset tracking coordination component.

Clause 20. The method of clause 19, wherein the scanning device is closer to the one or more wireless energy charging-capable devices than the asset tracking coordination component.

Clause 21. The method of clause 20, further comprising: transmitting, to the scanning device, an indication of the beacon scanning window.

Clause 22. An asset tracking coordination component, comprising: a memory; at least one transceiver; and at least one processor communicatively coupled to the memory and the at least one transceiver, the at least one processor configured to: estimate a distance between a wireless energy source and a scanning device; determine timing information associated with a wireless energy transmission from the wireless energy source; estimate a time of a beacon transmission from a wireless energy charging-capable device coupled to an asset within a threshold proximity of the scanning device based on the estimated distance and the timing information; and schedule a beacon scanning window for the scanning device to scan for the beacon transmission based on the estimated time.

Clause 23. The asset tracking coordination component of clause 22, wherein the asset tracking coordination component corresponds to an electronic shelf label (ESL) scanning device controller, and wherein the wireless energy charging-capable device corresponds to a passive Bluetooth low energy (BLE) label.

Clause 24. The asset tracking coordination component of any of clauses 22 to 23, wherein the at least one processor is further configured to: determine an expected wireless energy charging rate associated with the wireless energy charging-capable device in a candidate location area based on the distance, a power of the wireless energy transmission, and a frequency associated with the wireless energy transmission; and determine an energy charging level at which the wireless energy charging-capable device is triggered to transmit the beacon transmission, wherein the estimated time is based on the expected wireless energy charging rate and the energy charging level.

Clause 25. The asset tracking coordination component of any of clauses 22 to 24, wherein the scanning device comprises the asset tracking coordination component.

Clause 26. The asset tracking coordination component of any of clauses 22 to 25, wherein the scanning device is distinct from the asset tracking coordination component.

Clause 27. The asset tracking coordination component of clause 26, wherein the scanning device is closer to the wireless energy charging-capable device than the asset tracking coordination component.

Clause 28. The asset tracking coordination component of any of clauses 26 to 27, wherein the scheduling comprises transmission of an indication of the beacon scanning window to the scanning device.

Clause 29. The asset tracking coordination component of any of clauses 22 to 28, wherein the scanning device is separate from the wireless energy source.

Clause 30. A scanning device, comprising: a memory; at least one transceiver; and at least one processor communicatively coupled to the memory and the at least one transceiver, the at least one processor configured to: receive, via the at least one transceiver, from an asset tracking coordination component, a request to perform an asset scan in conjunction with a wireless energy transmission from the scanning device; perform, in response to the request, the wireless energy transmission; monitor, in response to the request during a beacon scanning window that is based on the wireless energy transmission, for one or more beacon transmissions from one or more wireless energy charging-capable device coupled to one or more assets within a threshold proximity of the scanning device; and transmit, via the at least one transceiver, to the asset tracking coordination component, scan result information based on the monitoring.

Clause 31. The scanning device of clause 30, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 32. The scanning device of any of clauses 30 to 31, wherein the scanning device comprises the asset tracking coordination component.

Clause 33. The scanning device of any of clauses 30 to 32, wherein the scanning device is distinct from the asset tracking coordination component.

Clause 34. The scanning device of clause 33, wherein the scanning device is closer to the one or more wireless energy charging-capable devices than the asset tracking coordination component.

Clause 35. The scanning device of any of clauses 33 to 34, wherein the at least one processor is further configured to: receive, via the at least one transceiver, from the asset tracking coordination component, an indication of the beacon scanning window.

Clause 36. An asset tracking coordination component, comprising: a memory; at least one transceiver; and at least one processor communicatively coupled to the memory and the at least one transceiver, the at least one processor configured to: transmit, via the at least one transceiver, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receive, via the at least one transceiver, from the wireless energy source, scan result information based on the monitoring.

Clause 37. The asset tracking coordination component of clause 36, wherein the beacon scanning window is determined based on one or more estimated times of one or more beacon transmission from the one or more wireless energy charging-capable devices.

Clause 38. The asset tracking coordination component of any of clauses 36 to 37, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 39. The asset tracking coordination component of any of clauses 36 to 38, wherein the scanning device comprises the asset tracking coordination component.

Clause 40. The asset tracking coordination component of any of clauses 36 to 39, wherein the scanning device is remote from the asset tracking coordination component.

Clause 41. The asset tracking coordination component of clause 40, wherein the scanning device is closer to the one or more wireless energy charging-capable devices than the asset tracking coordination component.

Clause 42. The asset tracking coordination component of clause 41, wherein the at least one processor is further configured to: transmit, via the at least one transceiver, to the scanning device, an indication of the beacon scanning window.

Clause 43. An asset tracking coordination component, comprising: means for estimating a distance between a wireless energy source and a scanning device; means for determining timing information associated with a wireless energy transmission from the wireless energy source; means for estimating a time of a beacon transmission from a wireless energy charging-capable device coupled to an asset within a threshold proximity of the scanning device based on the estimated distance and the timing information; and means for scheduling a beacon scanning window for the scanning device to scan for the beacon transmission based on the estimated time.

Clause 44. The asset tracking coordination component of clause 43, wherein the asset tracking coordination component corresponds to an electronic shelf label (ESL) scanning device controller, and wherein the wireless energy charging-capable device corresponds to a passive Bluetooth low energy (BLE) label.

Clause 45. The asset tracking coordination component of any of clauses 43 to 44, further comprising: means for determining an expected wireless energy charging rate associated with the wireless energy charging-capable device in a candidate location area based on the distance, a power of the wireless energy transmission, and a frequency associated with the wireless energy transmission; and means for determining an energy charging level at which the wireless energy charging-capable device is triggered to transmit the beacon transmission, wherein the estimated time is based on the expected wireless energy charging rate and the energy charging level.

Clause 46. The asset tracking coordination component of any of clauses 43 to 45, wherein the scanning device comprises the asset tracking coordination component.

Clause 47. The asset tracking coordination component of any of clauses 43 to 46, wherein the scanning device is distinct from the asset tracking coordination component.

Clause 48. The asset tracking coordination component of clause 47, wherein the scanning device is closer to the wireless energy charging-capable device than the asset tracking coordination component.

Clause 49. The asset tracking coordination component of any of clauses 47 to 48, wherein the scheduling comprises transmission of an indication of the beacon scanning window to the scanning device.

Clause 50. The asset tracking coordination component of any of clauses 43 to 49, wherein the scanning device is separate from the wireless energy source.

Clause 51. A scanning device, comprising: means for receiving, from an asset tracking coordination component, a request to perform an asset scan in conjunction with a wireless energy transmission from the scanning device; means for performing, in response to the request, the wireless energy transmission; means for monitoring, in response to the request during a beacon scanning window that is based on the wireless energy transmission, for one or more beacon transmissions from one or more wireless energy charging-capable device coupled to one or more assets within a threshold proximity of the scanning device; and means for transmitting, to the asset tracking coordination component, scan result information based on the monitoring.

Clause 52. The scanning device of clause 51, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 53. The scanning device of any of clauses 51 to 52, wherein the scanning device comprises the asset tracking coordination component.

Clause 54. The scanning device of any of clauses 51 to 53, wherein the scanning device is distinct from the asset tracking coordination component.

Clause 55. The scanning device of clause 54, wherein the scanning device is closer to the one or more wireless energy charging-capable devices than the asset tracking coordination component.

Clause 56. The scanning device of any of clauses 54 to 55, further comprising: means for receiving, from the asset tracking coordination component, an indication of the beacon scanning window.

Clause 57. An asset tracking coordination component, comprising: means for transmitting, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and means for receiving, from the wireless energy source, scan result information based on the monitoring.

Clause 58. The asset tracking coordination component of clause 57, wherein the beacon scanning window is determined based on one or more estimated times of one or more beacon transmission from the one or more wireless energy charging-capable devices.

Clause 59. The asset tracking coordination component of any of clauses 57 to 58, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 60. The asset tracking coordination component of any of clauses 57 to 59, wherein the scanning device comprises the asset tracking coordination component.

Clause 61. The asset tracking coordination component of any of clauses 57 to 60, wherein the scanning device is remote from the asset tracking coordination component.

Clause 62. The asset tracking coordination component of clause 61, wherein the scanning device is closer to the one or more wireless energy charging-capable devices than the asset tracking coordination component.

Clause 63. The asset tracking coordination component of clause 62, further comprising: means for transmitting, to the scanning device, an indication of the beacon scanning window.

Clause 64. A non-transitory computer-readable medium storing computer-executable instructions that, when executed by an asset tracking coordination component, cause the asset tracking coordination component to: estimate a distance between a wireless energy source and a scanning device; determine timing information associated with a wireless energy transmission from the wireless energy source; estimate a time of a beacon transmission from a wireless energy charging-capable device coupled to an asset within a threshold proximity of the scanning device based on the estimated distance and the timing information; and schedule a beacon scanning window for the scanning device to scan for the beacon transmission based on the estimated time.

Clause 65. The non-transitory computer-readable medium of clause 64, wherein the asset tracking coordination component corresponds to an electronic shelf label (ESL) scanning device controller, and wherein the wireless energy charging-capable device corresponds to a passive Bluetooth low energy (BLE) label.

Clause 66. The non-transitory computer-readable medium of any of clauses 64 to 65, further comprising computer-executable instructions that, when executed by the asset tracking coordination component, cause the asset tracking coordination component to: determine an expected wireless energy charging rate associated with the wireless energy charging-capable device in a candidate location area based on the distance, a power of the wireless energy transmission, and a frequency associated with the wireless energy transmission; and determine an energy charging level at which the wireless energy charging-capable device is triggered to transmit the beacon transmission, wherein the estimated time is based on the expected wireless energy charging rate and the energy charging level.

Clause 67. The non-transitory computer-readable medium of any of clauses 64 to 66, wherein the scanning device comprises the asset tracking coordination component.

Clause 68. The non-transitory computer-readable medium of any of clauses 64 to 67, wherein the scanning device is distinct from the asset tracking coordination component.

Clause 69. The non-transitory computer-readable medium of clause 68, wherein the scanning device is closer to the wireless energy charging-capable device than the asset tracking coordination component.

Clause 70. The non-transitory computer-readable medium of any of clauses 68 to 69, wherein the scheduling comprises transmission of an indication of the beacon scanning window to the scanning device.

Clause 71. The non-transitory computer-readable medium of any of clauses 64 to 70, wherein the scanning device is separate from the wireless energy source.

Clause 72. A non-transitory computer-readable medium storing computer-executable instructions that, when executed by a scanning device, cause the scanning device to: receive, from an asset tracking coordination component, a request to perform an asset scan in conjunction with a wireless energy transmission from the scanning device; perform, in response to the request, the wireless energy transmission; monitor, in response to the request during a beacon scanning window that is based on the wireless energy transmission, for one or more beacon transmissions from one or more wireless energy charging-capable device coupled to one or more assets within a threshold proximity of the scanning device; and transmit, to the asset tracking coordination component, scan result information based on the monitoring.

Clause 73. The non-transitory computer-readable medium of clause 72, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 74. The non-transitory computer-readable medium of any of clauses 72 to 73, wherein the scanning device comprises the asset tracking coordination component.

Clause 75. The non-transitory computer-readable medium of any of clauses 72 to 74, wherein the scanning device is distinct from the asset tracking coordination component.

Clause 76. The non-transitory computer-readable medium of clause 75, wherein the scanning device is closer to the one or more wireless energy charging-capable devices than the asset tracking coordination component.

Clause 77. The non-transitory computer-readable medium of any of clauses 75 to 76, further comprising computer-executable instructions that, when executed by the scanning device, cause the scanning device to: receive, from the asset tracking coordination component, an indication of the beacon scanning window.

Clause 78. A non-transitory computer-readable medium storing computer-executable instructions that, when executed by an asset tracking coordination component, cause the asset tracking coordination component to: transmit, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receive, from the wireless energy source, scan result information based on the monitoring.

Clause 79. The non-transitory computer-readable medium of clause 78, wherein the beacon scanning window is determined based on one or more estimated times of one or more beacon transmission from the one or more wireless energy charging-capable devices.

Clause 80. The non-transitory computer-readable medium of any of clauses 78 to 79, wherein the asset tracking coordination component corresponds to an electronic shelf label (ESL) scanning device controller, and wherein the one or more wireless energy charging-capable devices correspond to one or more passive Bluetooth low energy (BLE) labels.

Clause 81. The non-transitory computer-readable medium of any of clauses 78 to 80, wherein the scanning device comprises the asset tracking coordination component.

Clause 82. The non-transitory computer-readable medium of any of clauses 78 to 81, wherein the scanning device is remote from the asset tracking coordination component.

Clause 83. The non-transitory computer-readable medium of clause 82, wherein the scanning device is closer to the one or more wireless energy charging-capable devices than the asset tracking coordination component.

Clause 84. The non-transitory computer-readable medium of clause 83, further comprising computer-executable instructions that, when executed by the asset tracking coordination component, cause the asset tracking coordination component to: transmit, to the scanning device, an indication of the beacon scanning window.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of operating an asset tracking coordination component, comprising:
   estimating a distance between a wireless energy source and a scanning device;
   determining timing information associated with a wireless energy transmission from the wireless energy source;
   estimating a time of a beacon transmission from a wireless energy charging-capable device coupled to an asset within a threshold proximity of the scanning device based on the estimated distance and the timing information; and
   scheduling a beacon scanning window for the scanning device to scan for the beacon transmission based on the estimated time.

2. The method of claim 1,
   wherein the asset tracking coordination component corresponds to an electronic shelf label (ESL) scanning device controller, and
   wherein the wireless energy charging-capable device corresponds to a passive Bluetooth low energy (BLE) label.

3. The method of claim 1, further comprising:
   determining an expected wireless energy charging rate associated with the wireless energy charging-capable device in a candidate location area based on the distance, a power of the wireless energy transmission, and a frequency associated with the wireless energy transmission; and
   determining an energy charging level at which the wireless energy charging-capable device is triggered to transmit the beacon transmission,
   wherein the estimated time is based on the expected wireless energy charging rate and the energy charging level.

4. The method of claim 1, wherein the scanning device comprises the asset tracking coordination component.

5. The method of claim 1, wherein the scanning device is distinct from the asset tracking coordination component.

6. The method of claim 5, wherein the scanning device is closer to the wireless energy charging-capable device than the asset tracking coordination component.

7. The method of claim 5, wherein the scheduling comprises transmission of an indication of the beacon scanning window to the scanning device.

8. The method of claim 1, wherein the scanning device is separate from the wireless energy source.

9. A method of operating a scanning device, comprising:
   receiving, from an asset tracking coordination component, a request to perform an asset scan in conjunction with a wireless energy transmission from the scanning device;
   performing, in response to the request, the wireless energy transmission;
   monitoring, in response to the request during a beacon scanning window that is based on the wireless energy transmission, for one or more beacon transmissions from one or more wireless energy charging-capable device coupled to one or more assets within a threshold proximity of the scanning device; and
   transmitting, to the asset tracking coordination component, scan result information based on the monitoring.

10. The method of claim 9,
    wherein the asset tracking coordination component corresponds to an electronic shelf label (ESL) scanning device controller, and
    wherein the one or more wireless energy charging-capable devices correspond to one or more passive Bluetooth low energy (BLE) labels.

11. The method of claim 9, wherein the scanning device comprises the asset tracking coordination component.

12. The method of claim 9, wherein the scanning device is distinct from the asset tracking coordination component.

13. The method of claim 12, wherein the scanning device is closer to the one or more wireless energy charging-capable devices than the asset tracking coordination component.

14. The method of claim 12, further comprising:
    receiving, from the asset tracking coordination component, an indication of the beacon scanning window.

15. A method of operating an asset tracking coordination component, comprising:
    transmitting, to a scanning device, a request to perform an asset scan in conjunction with a wireless energy transmission from the scanning device, the asset scan comprising monitoring, during a beacon scanning window that is based on the wireless energy transmission, for one or more beacon transmissions from one or more wireless energy charging-capable devices that are coupled to one or more assets within a threshold proximity of a wireless energy source; and receiving, from the wireless energy source, scan result information based on the monitoring.

16. The method of claim 15, wherein the beacon scanning window is determined based on one or more estimated times of one or more beacon transmission from the one or more wireless energy charging-capable devices.

17. The method of claim 15,
wherein the asset tracking coordination component corresponds to an electronic shelf label (ESL) scanning device controller, and
wherein the one or more wireless energy charging-capable devices correspond to one or more passive Bluetooth low energy (BLE) labels.

18. The method of claim 15, wherein the scanning device comprises the asset tracking coordination component.

19. The method of claim 15, wherein the scanning device is remote from the asset tracking coordination component.

20. The method of claim 19, wherein the scanning device is closer to the one or more wireless energy charging-capable devices than the asset tracking coordination component.

21. The method of claim 20, further comprising:
transmitting, to the scanning device, an indication of the beacon scanning window.

22. An asset tracking coordination component, comprising:
a memory;
at least one transceiver; and
at least one processor communicatively coupled to the memory and the at least one transceiver, the at least one processor configured to:
estimate a distance between a wireless energy source and a scanning device;
determine timing information associated with a wireless energy transmission from the wireless energy source;
estimate a time of a beacon transmission from a wireless energy charging-capable device coupled to an asset within a threshold proximity of the scanning device based on the estimated distance and the timing information; and schedule a beacon scanning window for the scanning device to scan for the beacon transmission based on the estimated time.

23. The asset tracking coordination component of claim 22,
wherein the asset tracking coordination component corresponds to an electronic shelf label (ESL) scanning device controller, and
wherein the wireless energy charging-capable device corresponds to a passive Bluetooth low energy (BLE) label.

24. The asset tracking coordination component of claim 22, wherein the at least one processor is further configured to:
determine an expected wireless energy charging rate associated with the wireless energy charging-capable device in a candidate location area based on the distance, a power of the wireless energy transmission, and a frequency associated with the wireless energy transmission; and
determine an energy charging level at which the wireless energy charging-capable device is triggered to transmit the beacon transmission,
wherein the estimated time is based on the expected wireless energy charging rate and the energy charging level.

25. The asset tracking coordination component of claim 22, wherein the scanning device comprises the asset tracking coordination component.

26. The asset tracking coordination component of claim 22, wherein the scanning device is distinct from the asset tracking coordination component.

27. The asset tracking coordination component of claim 26, wherein the scanning device is closer to the wireless energy charging-capable device than the asset tracking coordination component.

28. The asset tracking coordination component of claim 26, wherein the scheduling comprises transmission of an indication of the beacon scanning window to the scanning device.

29. The asset tracking coordination component of claim 22, wherein the scanning device is separate from the wireless energy source.

* * * * *